US009462306B2

(12) United States Patent
Au et al.

(10) Patent No.: US 9,462,306 B2
(45) Date of Patent: Oct. 4, 2016

(54) STREAM-SWITCHING IN A CONTENT DISTRIBUTION SYSTEM

(71) Applicants: The Hong Kong University of Science and Technology, Kowloon (HK); Inter-University Research Institute Corporation, Research Organization of Information and Systems, Tokyo (JP)

(72) Inventors: Oscar Chi Lim Au, Clear Water Bay (HK); Wei Dai, Clear Water Bay (HK); Gene Cheung, Tokyo (JP); Ngai Man Cheung, Singapore (SG); Antonio Ortega Diego, Los Angeles, CA (US)

(73) Assignee: The Hong Kong University of Science and Technology, Kowloon (HK)

( * ) Notice: Subject to any disclaimer, the term of this patent is extended or adjusted under 35 U.S.C. 154(b) by 195 days.

(21) Appl. No.: 14/329,786

(22) Filed: Jul. 11, 2014

(65) Prior Publication Data

US 2015/0026747 A1 Jan. 22, 2015

Related U.S. Application Data

(60) Provisional application No. 61/957,941, filed on Jul. 16, 2013.

(51) Int. Cl.
*H04N 7/173* (2011.01)
*H04N 21/2343* (2011.01)
(Continued)

(52) U.S. Cl.
CPC ...... *H04N 21/23439* (2013.01); *H04N 19/126* (2014.11); *H04N 19/147* (2014.11);
(Continued)

(58) Field of Classification Search
CPC .................. H04N 21/23439; H04N 21/2662; H04N 21/4621; H04N 19/159; H04N 19/19; H04N 19/147
See application file for complete search history.

(56) References Cited

U.S. PATENT DOCUMENTS

| 6,543,053 B1 | 4/2003 | Li et al. |
| 7,706,447 B2 * | 4/2010 | Karczewicz ..... H04N 21/23424 375/240.12 |

(Continued)

FOREIGN PATENT DOCUMENTS

| CN | 102270348 A | 12/2011 |
| CN | 102497552 A | 6/2012 |
| KR | 20080079934 A | 9/2008 |

OTHER PUBLICATIONS

Cheung, et al., "Distributed source coding techniques for interactive multiview video streaming," in 27th Picture Coding Symposium, Chicago, IL, May 2009. 4 pages.

(Continued)

*Primary Examiner* — Chenea Smith
(74) *Attorney, Agent, or Firm* — Amin, Turocy & Watson, LLP

(57) ABSTRACT

Stream-switching techniques are applied in a content delivery system. A merge frame is generated as a function of bit-rates, distortion, and a piecewise constant operator. Parameters of the piecewise constant operator are selected to optimize the merge frame. Data streams are switched based on bandwidth requirements, switch requests, and throughput of a network. Images are reconstructed based on the merge frames and prediction frames. Reconstructed images are identically reconstructed for any prediction frame based on the merge frame.

24 Claims, 14 Drawing Sheets

(51) Int. Cl.
| | |
|---|---|
| H04N 21/2662 | (2011.01) |
| H04N 21/462 | (2011.01) |
| H04N 19/159 | (2014.01) |
| H04N 19/176 | (2014.01) |
| H04N 19/147 | (2014.01) |
| H04N 19/172 | (2014.01) |
| H04N 19/126 | (2014.01) |
| H04N 19/19 | (2014.01) |

(52) U.S. Cl.
 CPC ......... *H04N19/159* (2014.11); *H04N 19/172* (2014.11); *H04N 19/176* (2014.11); *H04N 19/19* (2014.11); *H04N 21/2662* (2013.01); *H04N 21/4621* (2013.01)

(56) References Cited

U.S. PATENT DOCUMENTS

| | | | | |
|---|---|---|---|---|
| 2002/0064228 | A1* | 5/2002 | Sethuraman | H04N 19/176 375/240.12 |
| 2006/0227870 | A1 | 10/2006 | Tian et al. | |
| 2009/0106807 | A1 | 4/2009 | Suzuki et al. | |
| 2011/0161517 | A1 | 6/2011 | Ferguson | |
| 2013/0163667 | A1 | 6/2013 | Nilsson et al. | |
| 2013/0176389 | A1* | 7/2013 | Chen | H04N 19/597 348/43 |

OTHER PUBLICATIONS

Cheung, et al. Rate-distortion Based reconstruction Optimization in distributed source coding for interactive multiview video streaming, Image Processing (ICIP), 2010 17th IEEE International Conference on. IEEE, 2010. 4 pages.

Karczewicz, et al. "The SP- and SI-Frames Design for H.264/AVC", IEEE Transactions on Circuits and Systems for Video Technology, vol. 13, No. 7, Jul. 2003, 8 pages.

Dai, et al. "Rate-distortion optimized merge frame using piecewise constant functions", 2013 20th IEEE International Conference on Image Processing (ICIP), Sep. 15-18, 2013, 5 pages.

Gelman et al. "Multiview Image Coding Using Depth Layers and an Optimized Bit Allocation", IEEE Transactions on Image Processing, May 2012, 31 pages.

Huang et al. "Practical Online Near-Duplicate Subsequence Detection for Continuous Video Streams", IEEE Transactions on Multimedia, vol. 12, No. 5, Aug. 2010, 13 pages.

Cote, Sabrina. "The Rise of Interactive Video and How Marketers Can Capitalize", published online at http://www.brainshark.com/Ideas-Blog/2014/January/the-rise-of-interactive-video-and-how-marketers-can-capitalize.aspx, Jan. 8, 2014, retrieved on Jan. 6, 2015, 3 pages.

O'Neill, Megan, "5 Upcoming Trends In Web Video Marketing That You Need to Know About" published online at https://socialtimes.com/web-video-marketing_b21921, Sep. 3, 2010, retrieved on Jan. 6, 2015, 5 pages.

IBISWorld. "Data Processing & Hosting Services in the US Market Research", published online at http://www.ibisworld.com/industry/default.aspx?indid=1281, Oct. 2014, retrieved on Jan. 6, 2015, 2 pages.

Cheung et al., "On media data structures for interactive streaming in immersive applications," published in SPIE Visual Communications and Image Processing, Jul. 2010, 8 pages.

Guo et al., "Wyner-Ziv switching scheme for multiple bit-rate video streaming", IEEE Transactions on Circuits and Systems for Video Technology, vol. 18, No. 5, May 2008, 13 pages.

Aaron et al. "Wyner-Ziv coding of light fields for random access," published in IEEE International Workshop on Multimedia Signal Processing, Sep. 2004, 4 pages.

Ramanathan et al. "Random access for compressed light fields using multiple representations," published in IEEE International Workshop on Multimedia Signal Processing, Sep. 2004, 4 pages.

Cheung et al., "Interactive streaming of stored multiview video using redundant frame structures", IEEE Transactions on Image Processing, vol. 20, No. 3, Mar. 2011, 18 pages.

Cheung et al., "Video Compression with Flexible Playback Order Based on Distributed Source Coding", published in IS&T/SPIE Visual Communications and Image Processing, Jan. 2006, 12 pages.

Cheung et al., "Compression algorithms for flexible video decoding" published in IS&T/SPIE Visual Communications and Image Processing, Jan. 2008, 15 pages.

Wiegand et al., "Overview of the H.264/AVC video coding standard", IEEE Transactions on Circuits and Systems for Video Technology, vol. 13, No. 7, Jul. 2003, 17 pages.

Pradhan et al., "Distributed source coding using syndromes (DISCUS): design and construction", IEEE Transactions on Information Theory, vol. 49, No. 3, Mar. 2003, 18 pages.

* cited by examiner

STREAM-SWITCHING IN A CONTENT DISTRIBUTION SYSTEM

CROSS REFERENCE TO RELATED APPLICATION

This application claims priority to U.S. Provisional Patent Application No. 61/957,941, filed on Jul. 16, 2013, and entitled "RATE-DISTORTION OPTIMIZED MERGE FRAME USING PIECEWISE CONSTANT FUNCTIONS," the entirety of which is hereby incorporated herein by reference.

TECHNICAL FIELD

This disclosure generally relates to content distribution and streaming, and, more specifically, to stream-switching in a content distribution system.

BACKGROUND

With advances in and proliferation of communication technologies, content sharing has become commonplace. For instance, video sharing and video on demand services have experienced increasing demand and have seen tremendous growth in popularity.

Content delivery networks or content distribution networks (CDNs) comprise servers located across the Internet that share content provided by a content provider. CDN providers provide infrastructure (e.g., a network of servers) to content providers to enable delivery of content over a network. Proxies or proxy servers typically cache content, and then fulfill successive requests for the same content, eliminating repetitive transmission of identical content over the network. End users comprise users that use personal computers or communication devices such as smart phones to access content over a CDN.

In the context of CDNs, content delivery describes an action of delivering content over a network in response to end user requests. The term 'content' refers to any kind of data, in any form, regardless of its representation and regardless of what it represents. Content generally includes both encoded media and metadata. Encoded content may include, without limitation, static, dynamic or continuous media, including streamed audio, streamed video, web pages, computer programs, documents, files, and the like. Some content may be embedded in other content, e.g., using markup languages such as HTML (Hyper Text Markup Language) and XML (Extensible Markup Language).

The above-described background is merely intended to provide contextual overview of content distribution in a network, and is not intended to be exhaustive. Additional context may become apparent upon review of one or more of the various non-limiting embodiments of the following detailed description.

BRIEF DESCRIPTION OF THE DRAWINGS

Various non-limiting embodiments are further described with reference to the accompanying drawings.

DETAILED DESCRIPTION

Figure 1:
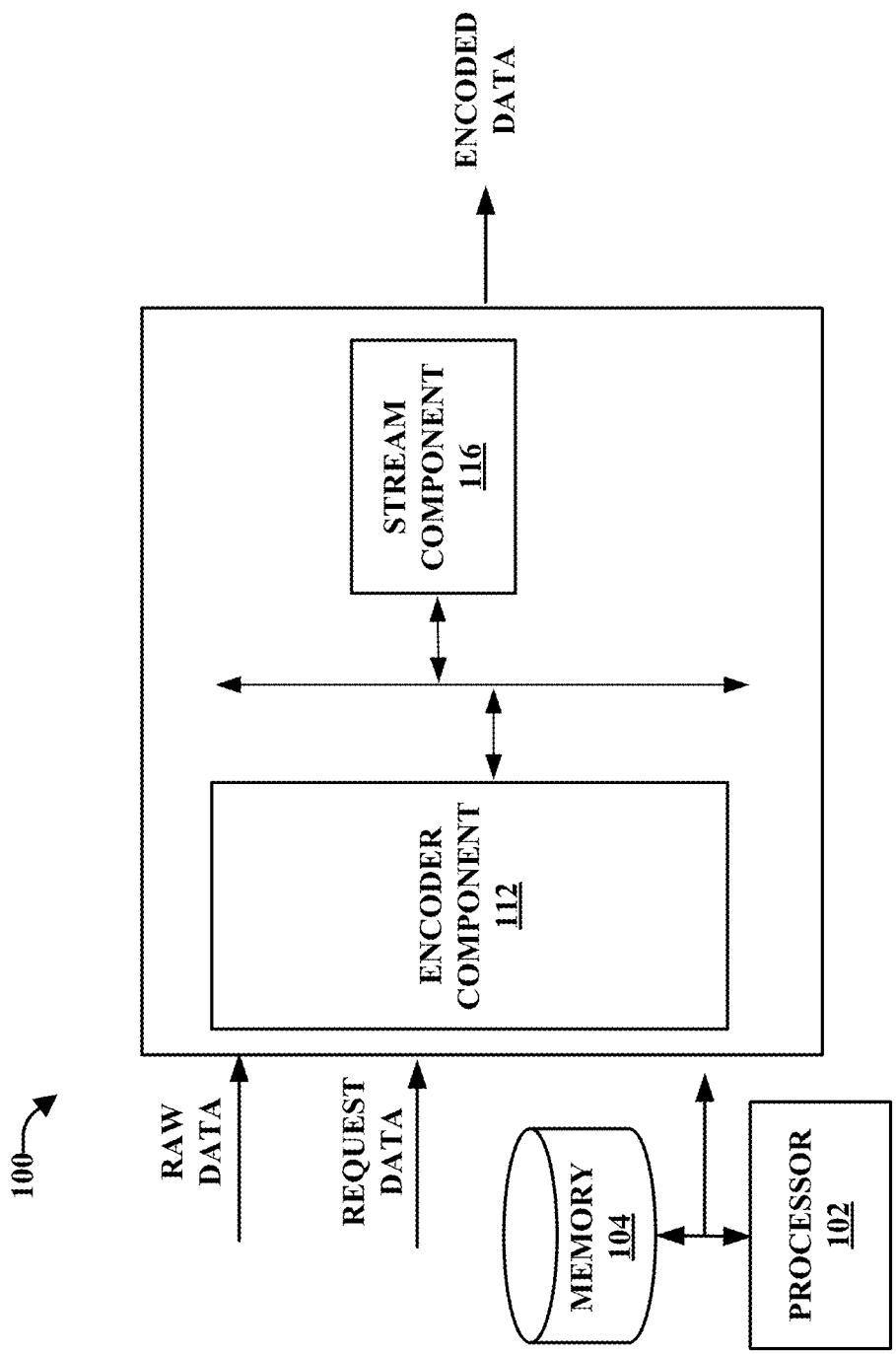
FIG. 1 illustrates an example functional block diagram of a system for streaming of content and merging content streams in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various aspects disclosed herein relate to distribution of content in a network and to encoding/decoding media content. An encoder is a device capable of encoding (e.g., coding) digital media data. A decoder is a device capable of decoding digital media data. A codec is a device capable of coding and/or decoding digital media data. The term codec is derived from a combination of the terms coder and decoder, or the terms compressor and decompressor. A variety of codecs is commercially available. Generally speaking, for example, codec classifications include discrete cosine transform codecs, fractal codecs, and wavelet codecs. An encoder or codec, by encoding the digital media data, can reduce the number of bits required to transmit signals thereby reducing associated transmission costs.

In video processing, prediction of objects in video frames of a video frame sequence can be useful to facilitate coding of the video frame sequence. Accurate prediction of objects within video frames can be an important factor for efficient compression coding. Motion prediction is one type of prediction that can be used for predicting objects to facilitate coding inter macroblocks of a video frame. There are other types of prediction that can be used during coding of video frames as well. For example, intra prediction can be used for predicting spatial correlations of pixels within a video.

However, conventional codecs may not produce a predictor block in an efficient way and/or may not identify the most efficient predictor block to use when encoding a block. As a result, conventional encoding techniques may use an undesirable number of bits (e.g., may use more bits than necessary) to encode a block, which can undesirably increase the costs of transmission and storage of the video. Further, video quality may be undesirably (e.g., negatively) affected.

To that end, techniques for efficient encoding and decoding of video content are presented. Systems and methods disclosed herein relate to selecting a merge mode, a skip mode, or an intra mode for coding blocks of a macroblock. Selecting modes and coding blocks according to the mode can facilitate generating merge frames to switch between content streams. For example, a merge frame can be generated such that prediction frames from different streams can, in conjunction with the merge frame, reconstruct to an identical image. As such, the data rate required to achieve desired output quality can be reduced and/or the quality of decoded output can be improved.

Referring now to the drawings, with reference initially to FIG. 1, presented is a system 100 that can facilitate streaming of content and merging content streams. Aspects of the systems, apparatuses or processes explained herein can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described herein.

System 100 can primarily include a computer processing unit 102 capable of executing various components stored in a computer readable memory 104, such as an encoder component 112 (which can encode raw data) and a stream component 116 (which can manage content streams). It is noted that the system 100 can comprise more or different components to facilitate aspects disclosed herein. Moreover, while components are depicted as separate components, it is noted that the components can be comprised in one or more devices, in a single device, across devices, and the like. System 100 can comprise devices, such as personal computers, servers, rack servers, laptop computers, tablet computers, smart phones, personal digital assistants, and the like. The components of system 100 can communicate a data stream and/or substreams of data as encoded data. Disparate data streams and/or substreams can be communicated simultaneously or substantially simultaneously to one or more different devices.

In an aspect, system 100 can provide content to other devices or components as encoded data. In an aspect, encoded data can comprise compressed or encoded video, audio, and/or other media to be transmitted, such as to an end user device. Encoded data can be encoded in various formats, according to quality metrics (e.g., bit-rates), and the like. In an example, encoded data can comprise a video stream for interactive streaming applications. In an aspect, system 100 can switch among streams of the same video at different bit-rates for real-time or near real-time bandwidth adaption. In another aspect, system 100 can facilitate switching among streams of the same video captured at different viewpoints ("view-switching").

The encoder component 112 can receive image and/or video frames (e.g., RAW DATA shown in FIG. 1), as well as associated audio. In an example, the frames can be an input video signal represented as a series of image frames. Reference frames can be stored in one or more reference buffers. Reference frames can include a past frame, a current frame, or a future frame. Encoder component 112 can encode media content prior to receiving a request for the media content, during servicing of media content, or at another time.

Encoder component 112 can apply transforms to macroblocks, such as a discrete cosine transform (DCT), or the like. In another aspect, frames can be segmented into other image processing units (e.g., coding tree unit) for video encoding. It is noted that embodiments describing or utilizing macroblocks or blocks can also utilize other image processing units for video encoding. Encoder component 112 can select individual prediction types on a macroblock basis, a frame basis, or the like. For example, a frame can be segmented into sequences of macroblocks called slices, and instead of using intra-coded frames (I-frames), Bi-predictive frames (B-frames), and Predicted frames (P-frames) type selections for each frame, the encoder can choose the prediction type distinctly for each individual slice. In general, I-frames comprise data describing a fully specified image and do not require other frames to be rendered. P-frames comprise data describing changes to an image of a previous frame, thus encoded P-frames comprise less data than I-frames but require previous frames to render properly. Likewise, B-frames describe differences in respect to a previous frame and differences in respect to a next frame. Encoder component 112 can also utilize techniques such as multi-frame motion estimation, which will allow increases in the quality of the video while allowing the same compression ratio.

Encoder component 112 can encode media content and multiple bit-rates and/or according to one or more quality metrics. For example, encoder component 112 can encode a video at various levels of quality or at various bit-rates (e.g., high, medium, low, etc.). The levels of quality can be stored by stream component 116. In an aspect, stream component 116 can facilitate storage of the data streams in storage devices, such as in memory 104, a buffer, or other storage devices. Encoder component 112 can encode related videos that are associated with a common video source but have different views.

Stream component 116 can instruct encoder component 112 to encode media content in any number of bit-rates or according to various compression techniques. The number of streams or associate methods of encoding can be determine according to preset values, dynamically determined values, or according to user input. In another aspect, stream component 116 can manage streaming of encoded media content (e.g., media streams). For example, a user can request, via a user device, access to a video via a CDN. The stream component 116 can provide (e.g., facilitate transmission) the encoded video to the user device.

In embodiments, stream component 116 can determine a required or appropriate bit-rate (or other quality metric) at which the user device should receive the encoded data stream. The bit-rate can be determined based on a service agreement, availability of network resources (e.g., load on the network), data describing parameters of a user devices (e.g., processing speed, graphics capabilities, screen size, etc.), or any number of criteria. In response to determining the appropriate bit-rate, stream component 116 can select an appropriate data stream based on the appropriate bit-rate. Stream component 116 can facilitate transmission of the selected data stream to the user device through the CDN.

In various embodiments of the subject disclosure, stream component 116 can receive requests to switch or alter a content stream (REQUEST DATA in FIG. 1). The requests can be based on user input, changes in network characteristics (e.g., altered level of load on a network), changes in a service level agreement, information received from a receiving device, or the like. For example, a user watching an interactive video can desire to view a scene from a different available angle. The user can provide input to a user device and the user device can send the request to system 100. In another example, stream component 116 can determine that a network has an increased capacity or ability to transmit a larger amount of data (e.g., a higher bit-rate data stream can be utilized) and the stream can be switched.

In some systems capable of stream-switching, I-frames are inserted at each switching point of a content stream. As media streams are switched, I-frames are inserted into the media streams at each switching point. While I-frames provide a low complexity solution to stream-switching, their relatively large size, in comparison with sizes of other frame types, can negatively affect quality. In H.264, switching slices, called switching P-frames/slices and switching I-frames/slices, are used to direct a decoder to jump into an ongoing video stream for such purposes as video streaming bit-rate switching and "trick mode" operation. When a decoder jumps into the middle of a video stream using the switching P-frame or the switching I-frame feature as references prior to the switch, it can get an exact match to the decoded pictures at that location in the video stream despite using different reference pictures, or no pictures at all. Distributed source coding (DSC) can be utilized with Side Information (SI) frames to exploit the correlation between sets of possible frames from which a client is switching and the target frame for coding gain. However, SI frame plus DSC frame design has significant problems. First, use of bit-plane encoding and channel codes means the computation complexity in both an encoder and a decoder is high. Further, because average statistics of a transform coefficient bit-plane for the entire image are used, non-stationary noise statistics can lead to high rate channel codes, resulting in coding inefficiency.

Encoder component 112 can facilitate stream-switching between encoded data streams. In an aspect, encoder component 112 can perform stream-switching based on the concept of "signal merging". Signal merging can comprise merging any SI frame into an identically reconstructed good signal using a piecewise constant (pwc) function as the merge operator. Specifically, encoder component 112 can utilize a merge mode for a code block, where for the $k^{th}$ transform coefficient in the block, an appropriate step size and a horizontal shift parameter of a floor function are encoded at the encoder, so that the resulting floor function at the decoder can map corresponding coefficients from any SI frame to the same reconstructed value regardless of which data stream is utilized. Encoder component 112 can select the step size and horizontal shift based on rate-distortion optimization procedures to optimize parameters of system 100. For example, the step size and horizontal shift can be selected to positively affect signal fidelity and coding rate. In another aspect, encoder component 112 can select coding modes between an intra mode, a skip mode, and a merge mode, as described herein, on a per block basis. In other embodiments, encoder component 112 can select coding modes on other bases (e.g., portions of a macroblock (4×4 block), and the like). In an aspect, the skip mode can be utilized when corresponding blocks from all the SI frames are identical, in terms of the quantization bin indices after transform and quantization, to each other. In this situation, there is no need to code them at all, so identical blocks are skipped (i.e., coded identically).

Figure 2:
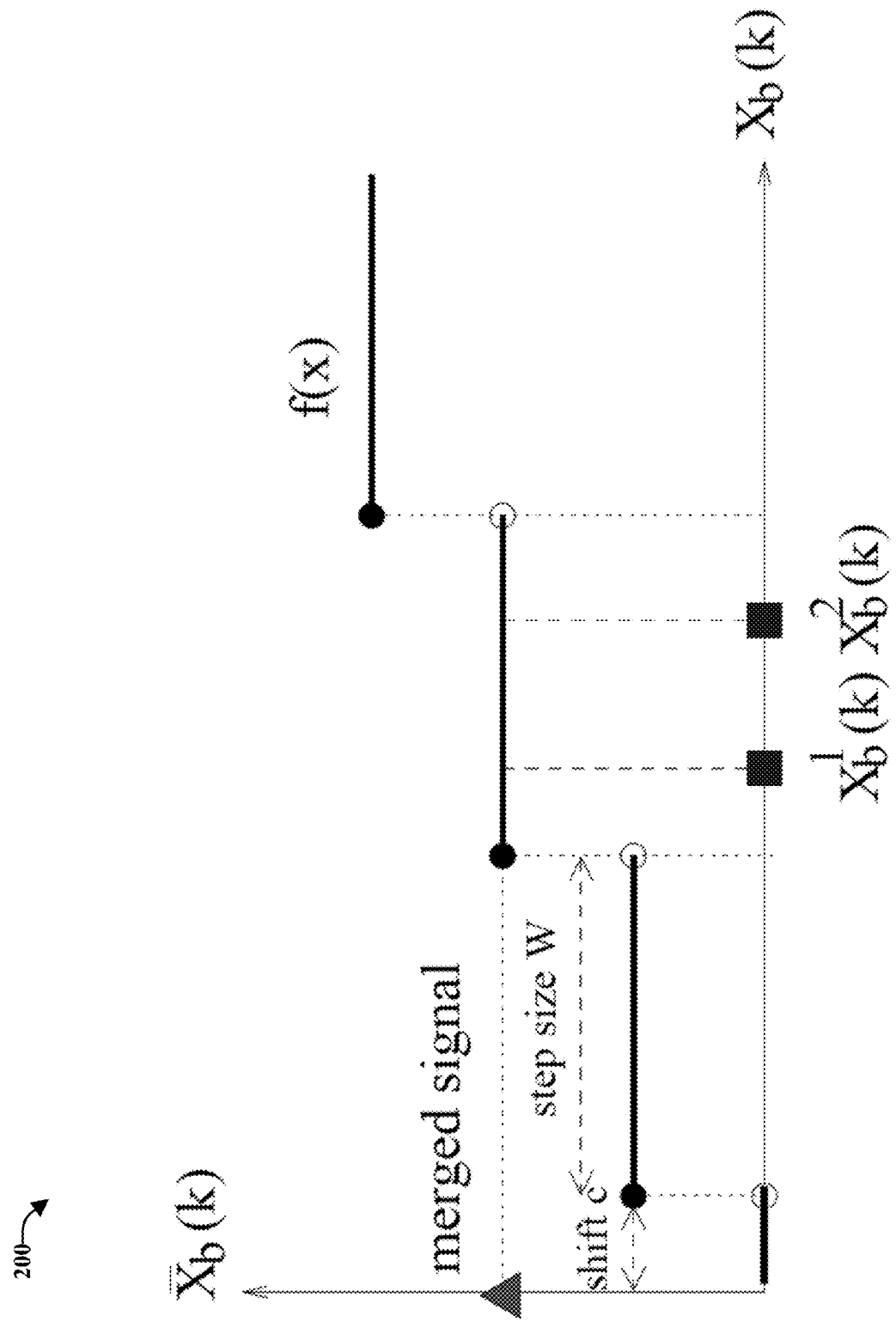
FIG. 2 illustrates an example graph of mapping side information in accordance with an embodiment.

Referring now to FIG. 2, with reference to FIG. 1, presented is a graph 200 depicting mapping of SI frames based on one or more disclosed aspects. Graph 200 depicts the $k^{th}$ transform coefficients of block b from two SI frames, $X_b^1(k)$ and $X_b^2(k)$ on the same step of pwc function $f(x)$. Thus, either one of the two values can be mapped via $f(x)$ to the same (merged) signal $\bar{X}_b(k)$. Given that $X_b^1(k)$ and $X_b^2(k)$ are both known during encoding, encoder component 112 can choose among any combination of step size W and shift c to guarantee unique reconstruction, including combinations that recover the target frame's original $k^{th}$ coefficient, $Y_b(k)$, exactly. Unlike coset coding methods, encoder component 112 can use this degree of freedom to choose values for W and c that optimally trade off rate of encoding and distortion.

In one or more embodiments, encoder component 112 can generate a merge frame as a stream-switching mechanism. A merge frame can have code blocks encoded using a merge mode, a skip mode, or an intra mode. To generate the merge frame, encoder component 112 can encode an SI frame for each possible switch from a first frame ($F_i$) to a second frame ($F_j$). The SI frame can comprise a P-frame differentially coded using $F_i$ as predictor and $F_j$ as target. Thus the SI frames constitute the best approximation of the target frame given their respective predictor frames.

Figure 3:
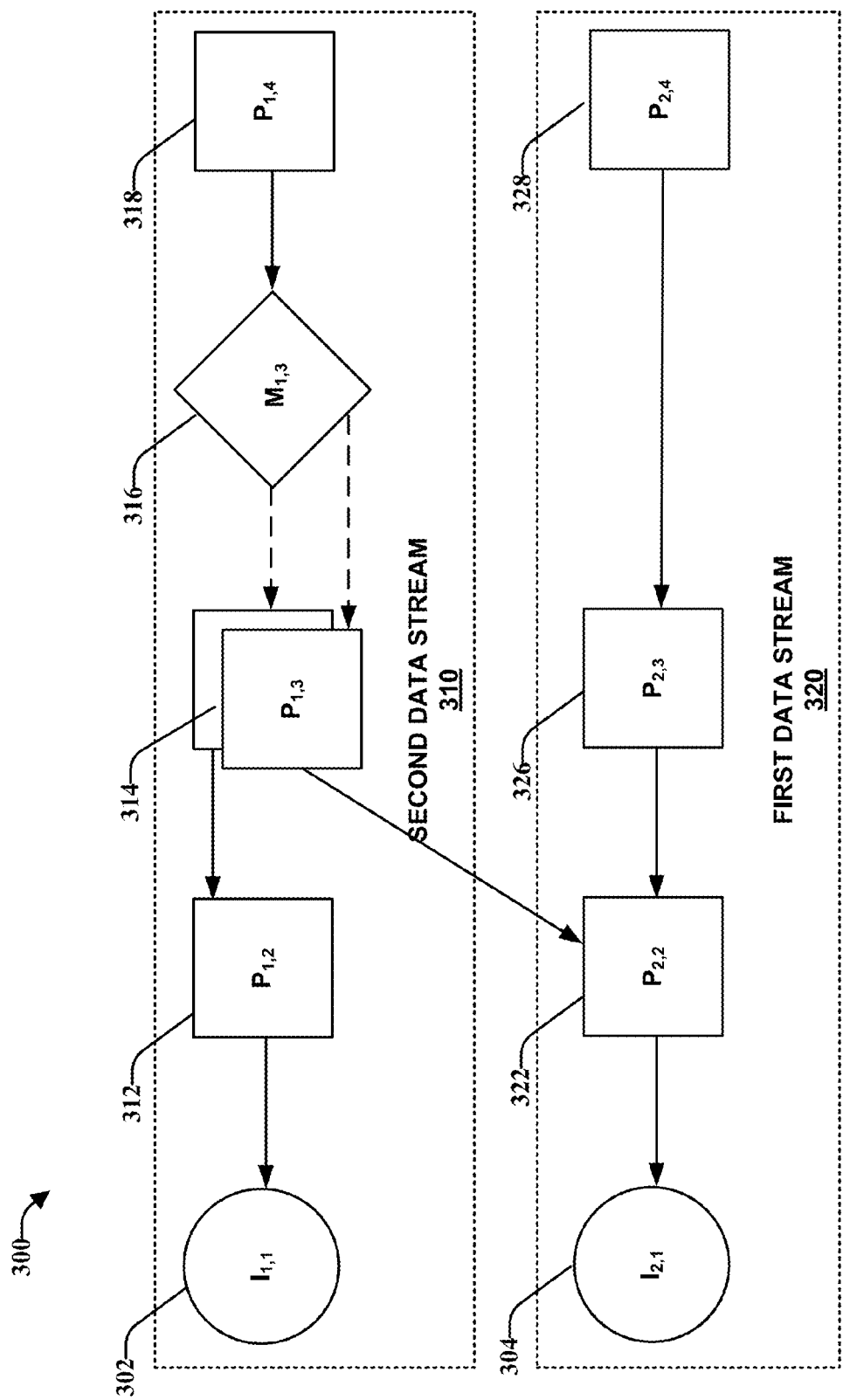
FIG. 3 illustrates an example functional block diagram of a system for stream-switching and generating merge frames in accordance with various embodiments.

Turning to FIG. 3, while maintaining reference to FIG. 1, there depicted is a high-level block diagram of a stream-switching system 300 according to embodiments of this disclosure. In an aspect, system 300 depicts merging from a first data stream 320 to a second data stream 310. As depicted two P-frames $P_{1,3}$'s 314 (representing SI frames) of second data stream 310 at time instance three, can be predicted (e.g., via encoder component 112) from predictor frames at time instance two (which precedes time instance three), namely $P_{1,2}$ 312 of second data stream 310 and $P_{2,2}$ 322 of first data stream 320. Encoder component 112 can generate or encode a merge frame $M_{1,3}$ 316 to merge any possible SI frame ($P_{1,3}$'s 314) to an identically reconstructed version of the target frame. During a stream-switching, the stream component 116 can transmit any one of the SI frames ($P_{1,3}$'s 314) plus the merge frame ($M_{1,3}$ 316) for an identical reconstruction, and avoid coding drift in the following frames that are predicted from the merge frame.

As depicted, multiple SI frames can be generated per switching time. Each SI frame can represent an approximation of the target frame $P_{1,3}$ 314. The merge frame $M_{1,3}$ 316 can be encoded as an extra frame to be decoded in addition, so that $P_{1,3}$ 314 can be decoded to an identical image regardless of which of the $P_{1,3}$'s 314 is utilized.

In one or more embodiments, encoder component 112 can encode a merge frame ($M_{1,3}$ 316 in FIG. 3) such that a distortion with respect to a target frame and an encoding rate of the merge frame are traded off (i.e., balanced) according to an optimization process. It is noted that at an encoding time all SI frames are known. Let a set of N SI frames be $S^1, \ldots, S^N$, where N is a number. There is an uncertainty at encoding time as to which one of the N SI frames will be available at a decoder buffer for decoding of the merge frame. Let the reconstructed image after decoding the merge frame be $\bar{T}$, which is an approximation of the target image T. In an aspect, encoder component 112 can generate the merge frame M such that distortion with respect to target image T, $D_T(M)$, and encoding rate of the merge frame, R(M), are optimally traded off according to a desired balancing process, that is:

$$\min_M D_T(M) + \lambda R(M) \quad (1)$$

such that each combination of SI frame $S^n$ and merge frame M can identically reconstruct (e.g., via an encoder or a decoder) to T. In another aspect, encoder component 112 can generate a merge frame M according to a rate-distortion optimization process.

In an aspect, encoder component 112 can select an encoding mode for blocks in a merge frame, such as a merge mode, an intra mode, or a skip mode. For a particular block b, $b \in B_M$ denotes the block is encoded using a merge mode, $b \in B_1$ means the block is encoded using an intra mode, and $b \in B_S$ means the block is encoded using a skip mode.

In an embodiment, encoder component 112 can transform and quantize pixels associated with media content to a code block. To achieve stream-switching with identical reconstruction, coefficients from different SI frames which belonging to the same corresponding locations must be mapped to the same quantization index. A pwc function can be utilized as a merge operator. It is noted that various functions can be utilized as a pwc function, such as ceil, round, floor, and the like. While embodiments may describe a particular pwc function, any other pwc function can be utilized to facilitate various aspects disclosed herein. For example, a K– pixel code block of index b from SI frame $S^n$, $x_b^n$, can be transformed, by encoder component 112, to $Y_b^n = [Y_b^n(0), \ldots, Y_b^n(K-1)]$, where $Y_b^n(k)$ is the $k^{th}$ transform coefficient of block b of SI frame n. Further, let $X_b^n$ represent the quantization bin indicies given quantization step size $Q_M = [Q_M(0), \ldots, Q_M(K-1)]$ for different DCT frequencies. This implies that $X_b^n(k)$ is an integer, i.e., $$X_b^n(k) \in I, \, X_b^n(k) = \text{round}\left(\frac{Y_b^n(k)}{Q_M(k)}\right),$$

where round(x) stands for a rounding operation for x.

To have identical reconstruction $\overline{X}_b$ for block b in reconstructed frame T, each one of $k^{th}$ coefficients $X_b^1(k), \ldots, X_b^N(k)$ must be mapped to the same quantization index $\overline{X}_b(k)$. This can be accomplished through a pwc function, as illustrated in FIG. 2 for N=2. In at least one embodiment, encoder component 112 can utilize a floor function, $f(x)$, as the pwc function, where the floor function can be defined such that the maximum difference between original x and reconstructed $f(x)$, after horizontal shift of c and floor operation with step size W, is minimized. For example, the floor function can be given as:

$$f(x) = \left\lfloor \frac{x+c}{W} \right\rfloor W + \frac{W}{2} - c \quad (2)$$

where the step size given as W and the horizontal shift given as c.

It is noted, each SI frame is correlated with a target frame, thus each of the SI frames themselves are correlated. Hence, the largest difference between any pair in $X_b^1(k), \ldots, X_b^N(k)$ for $k^{th}$ coefficient in block b is relatively small on average. Let $W_b(k)$ be the maximum difference between two $k^{th}$ coefficients in block b from any two SI frames; for example:

$$W_b(k) = \max_{n=1,\ldots,N} X_b^n(k) - \min_{n=1,\ldots,N} X_b^n(k) \quad (3)$$

Given $W_b(k)$, a group-wise maximum difference for a group $B_M$ of blocks, $W_{B_M}(k)$ can be defined as:

$$W_{B_M}(k) = \max_{b \in B_M} W_b(k) \quad (4)$$

given $X_b^n(k)$'s are integers, $W_{B_M}(k)$ is also an integer.

For any block b in group $B_M$, a step size $W_{B_M}^+(k) = W_{B_M}(k) + \epsilon$ is sufficient for the floor function $f(x)$ to map any coefficient in $X_b^1(k), \ldots, X_b^N(k)$ to the same value, for any $\epsilon > 0$, if the horizontal shift $c_b(k)$ is appropriately chosen. In one or more aspects, a small step size $W_{B_M}^+(k)$ can be chosen while maintaining $c \in I$ by keeping $\epsilon \in I$. In another aspect, shift $c_b(k)$ can be chosen (e.g., via encoder component 112) such that any coefficient in $X_b^n(k)$, $n \in \{1, \ldots, N\}$, is mapped to the same value via $f(x)$, i.e.:

$$\left\lfloor \frac{X_b^1(k) + c_b(k)}{W_{B_M}^+(k)} \right\rfloor = \left\lfloor \frac{X_b^n(k) + c_b(k)}{W_{B_M}^+(k)} \right\rfloor \forall n \in \{1, \ldots, N\}$$

It is noted that the feasible set of values of $c_b(k) \in I$, denoted as $F_b(k)$, are:

$$c_b^{min}(k) + mW_{B_M}^+(k) \le c_b(k) \le c_b^{max}(k) + mW_{B_M}^+(k) \quad (5)$$

where m is an integer, and $c_b^{min}(k)$ and $c_b^{max}(k)$ are defined as:

$$c_b^{min}(k) = -(X_b^{min}(k) \bmod W_{B_M}^+(k)) \quad (6)$$

$$c_b^{max}(k) = c_b^{min}(k) + W_{B_M}^+(k) - W_b(k) - 1 \quad (7)$$

Note that equation (4) gives $W_{B_M}^+(k) \ge W_{B_M}(k) + 1 \ge W_b(k) + 1$, and so $c_b^{max}(k) \ge c_b^{min}(k)$. It is also noted that $c_b^{max}(k), c_b^{min}(k) \in I$.

Encoder component 112 can determine a horizontal shift based in part on a desired or acceptable level of distortion in a reconstructed signal. For example, different horizontal shifts $c_b(k)$'s in feasible set $F_b(k)$ of equation (5) induce different distortion in the reconstructed signal. To select a horizontal shift, encoder component 112 can define distortion for the $k^{th}$ coefficient of block b, $d_b(k)$, to be the difference between the original $k^{th}$ coefficient $Y_b(k)$ of the target image T and reconstructed coefficient $f(X_b^1(k))Q_M(k)$:

$$d_b(k) = |Y_b(k) - f(X_b^1(k))Q_M(k)|^2 \quad (8)$$

Selection of a valid horizontal shift $c_b(k)$ results in all N $k^{th}$ coefficients $X_b^n(k)$'s being mapped to the same value $f(X_b^n(k)), \forall n \in \{1, \ldots, N\}$. Accordingly, encoder component 112 can consider only $f(X_b^1(k))$ in equation (8).

Given $f(x)$ in equation (2) and step size W, shift c, where $c \in I$, is capable of moving input x only within a neighborhood of W integers around x. For example, let $x = x_1 W + x_2$, where $x_1, x_2 \in I$ and $0 \le x_2 \le W-1$. Similarly, let $c = c_1 W + c_2$. Assume first the case where $x_2 + c_2 < W$ for equation (2), thus:

$$f(x) = \left\lfloor \frac{(x_1+c_1)W + (x_2+c_2)}{W} \right\rfloor W + \frac{W}{2} - c$$

$$= (x_1+c_1)W + \frac{W}{2} - c_1 W - c_2$$

$$= x_1 W + \frac{W}{2} - c_2$$

Hence C can decrease $f(x)$ by $c_2$, given $0 \leq c_2 < W - x_2$.

Referring again to equation (2) but now considering the case where $x_2 + c_2 \geq W$. Let $W + b_2 = x_2 + c_2$, where $0 \leq b_2 \leq W - 2$:

$$f(x) = \left\lfloor \frac{(x_1+c_1+1)W + b_2}{W} \right\rfloor W + \frac{W}{2} - c$$

$$= (x_1+c_1+1)W + \frac{W}{2} - c_1 W - c_2$$

$$= (x_1+1)W + \frac{W}{2} - c_2$$

Hence c can increase $f(x)$ by $W - c_2$, where $W - x_2 \leq c_2 \leq W - 1$.

In at least some embodiments disclosed herein, encoder component 112 can select a shift value from a restricted range of possible shift values. For example, though the feasible set $F_b(k)$ for $c_b(k)$ as described in equation (5) is large, a restricted range of $0 \leq c_b(k) \leq W - 1$ is sufficient to induce all possible changes in $f(x)$, as described herein. It is noted that encoder component 112, which selects a larger the step size W, can select a shift value from a larger range of values $c_b(k)$, though the resulting coding cost of $c_b(k)$ may also increase. As an example, using the floor function $f(x)$ for transform coefficient merging, encoding cost for the $k^{th}$ coefficient in block group $B_M$ of the merge frame M is the following:

1. one step size $W_{B_M}^+(k) = W_{B_M}(k) + \epsilon$ for group $B_M$.
2. one horizontal shift $c_b(k)$ for each block in group $B_M$.

The cost of encoding a single $W_{B_M}^+(k)$ (e.g., $W_{B_M}(k) + \epsilon$) for $k^{th}$ coefficients of a large group $B_M$ is small. While, the cost of encoding $|B_M|$ horizontal shifts $c_b(k)$'s for $k^{th}$ coefficient can be expensive. Accordingly, encoder component 112 can identify blocks in a frame as merge blocks in merge group $B_M$ and can facilitate efficient coding of horizontal shifts $c_b(k)$'s for blocks in group $B_M$ based on a quality criterion, such as rate-distortion optimization.

Encoder component 112 can determine a measurement of difference between frames or portions of frames. The level of difference can be based on a particular visual channel (brightness, intensity, hue, etc.), a level of motion, or on multiple visual channels. For example, encoder component 112 can determine a level of difference for blocks across SI frames. In an aspect, encoder component 112 can determine to utilize a merge mode based on the determined level of difference and/or a number of bits needed to encode parameters of a pwc function. It is noted that, if the level of difference meets a threshold level of difference, then the number of bits to code parameters of the floor function for signal merging may be high and an intra coding mode can be selected. In another aspect, if the level of difference is zero, a skip mode can be utilized.

In another aspect, encoder component 112 can determine whether a bit-rate meets a threshold level. If the level is met, encoder component 112 can set high frequency coefficients to be zero to encode $c_b(k)$. An end of block (EOB) flag, denoted $E_b$, for block b, $b \in B_M$ can be generated such that all high frequency coefficients (e.g., coefficients meets a defined frequency threshold) will be set to zero and the feasible range of $E_b$ can be $[0, \ldots K-1]$. It is noted that coding horizontal shifts $c_b(k)$ for the $k^{th}$ coefficient can be expensive and that high frequency transform coefficients are mostly zero or near zero.

It is further noted that encoding performance of different modes can be influenced by different parameters. As such, we can define a vector of parameters to visualization the modeling, as follows:

$$V_b = \begin{cases} \{Q_M\}, & \text{if } b \in B_S \\ \{Q_I\}, & \text{if } b \in B_I \\ \{Q_M, W_{B_M}^+, c_b, E_b\}, & \text{if } b \in B_M \end{cases}$$

where $Q_M$ is the quantization step size for a skip block and a merge block, and $Q_I$ is the quantization step size for an intra block.

It is further noted that an optimization of bit-rate and distortion can be given as:

$$\min_{M_b, V_b} \sum_{b=1}^{B} D_b(M_b, V_b) + \lambda \sum_{b=1}^{B} R_b(M_b, V_b)$$

s.t. $M_b \in \{\text{skip, intra, merge}\}$ $0 \leq E_b \leq K - 1, E_b \in I$ $W_b(k) = \max_{n=1,\ldots,N} X_b^n(k) - \min_{n=1,\ldots,N} X_b^n(k), b \in B_M$ $W_{B_M}(k) = \max_{b \in B_M, k \leq E_b} W_b(k), k = 0, \ldots, K-1$ $W_{B_M}^+(k) = W_{B_M}(k) + \epsilon, \epsilon \in I$ $c_b \in \left[ c_b^{min}(k) + m W_{B_M}^+(k), c_b^{max}(k) + m W_{B_M}^+(k) \right] \cup \left[ 0, W_{B_M}^+ - 1 \right]$ $c_b(k) \in I$ In at least one embodiment, encoder component 112 can select parameters to optimize all blocks in the merge frame. In an aspect, encoder component 112 can select a mode on a block-by-block basis. Encoder component 112 can determine bit-rate and distortion cost for intra blocks, merge blocks, and skip blocks as follows, where $R_b^I(k)$ and $R_b^M(k)$ represents bits needed to encode the $k^{th}$ coefficients in the respective coding modes.

$$D_b(V_b \mid b \in B_I) = \sum_{k=0}^{K-1} \left( Y_b(k) - \text{Round}\left(\frac{Y_b(k)}{Q_I(k)}\right) Q_I(k) \right)^2$$

$$R_b^I(V_b \mid b \in B_I) = \sum_{k=0}^{K-1} R_b^I(k)$$

$$D_b(V_b \mid b \in B_M) = \sum_{k=0}^{E_b} d_b(k) + \sum_{k=E_b+1}^{K-1} Y_b(k)^2$$

$$R_b^M(V_b \mid b \in B_M) = \sum_{k=0}^{E_b} R_b^M(k)$$

$$D_b(V_b \mid b \in B_S) = \sum_{k=0}^{K-1} (Y_b(k) - X_b^1(k) Q_M(k))^2$$

$$R_b(V_b \mid b \in B_S) = 0$$

In an aspect, if $W_{B_M}^+(k)$, $Q_M$, and c are selected, the distortion and rate for encoding frequency in a block is already determined. Encoder component 112 can then determine the EOB position in a rate-distortion optimization manner. For example, $$E_b = \underset{0 \leq k \leq K-1}{\operatorname{argmin}} \sum_{i=0}^{k} d_b(i) + \sum_{i=k+1}^{K-1} Y_b(i)^2 + \lambda \sum_{i=0}^{k} R_M(i).$$

In an aspect, encoder component 112 can identify blocks to be encoded as intra blocks, skip blocks or merge blocks based on a selection process. For example, in some embodiments, the encoder component 112 can select a skip mode, a merge mode, or an intra mode for coding blocks on a block-by-block basis. Encoder component 112 can determine an average distortion per block, given as $\hat{d}$. Encoder component 112 can then select the quantization parameter for intra-coded blocks, so that the average distortion is also $\hat{d}$. For each block b in a snake order (e.g., top left to bottom right, etc.) or other defined order, encoder component 112 can evaluate the blocks rate-distortion cost when coding. For example, using mode m: $D_b(m)+\lambda R_b(m)$, where m∈{intra, merge, skip}. For intra, the intra-coded block's distortion $D_b$ and rate $R_b$ are determined by the aforementioned quantization parameter. Distortion and rate for a block coded in merge mode are the corresponding sums of distortion and rate for all individual frequencies in the block, as described in more detail below. In an aspect, encoder component 112 can select the skip mode when blocks from associated SI frames are determined to be identical to each other. For example, the skip mode can be utilized when corresponding blocks from all the SI frames are identical, in terms of the quantization bin indices after transform and quantization, to each other. In this situation, there is no need to code them, so identical blocks are skipped during a coding process. Encoder component 112 can select the mode (intra, skip, or merge) such that the smallest rate-distortion cost is selected for encoding of a block b. In an aspect, if the rate-distortion cost for the modes are within a threshold range of each other (e.g., sufficiently close), encoder component 112 can select either mode according to a desired configuration, a size of a frame resulting from implementing the mode, and the like.

Given the blocks chosen for coding in merge mode (b∈$B_M$), let $W^*(k)=\max_b W_b(k)$ are the largest $W_b(k)$ of $k^{th}$ coefficient in these blocks, encoder component 112 can re-optimize the shift selection in these blocks given $W^*(k)$. It is noted that because the blocks with large difference among SI frames have been declared to be intra blocks, the remaining blocks should be more similar, which will result in smaller $W^*(k)$. A small step size $W^*(k)+\epsilon$ means the size of the alphabet for encoding of horizontal shifts $c_b(k)$, $c_b(k)\in[0,W^*(k)+\epsilon)$, is also small, leading to coding gain.

In another aspect, encoder component 112 can reselect a horizontal shift $c_b(k)$ for $k^{th}$ coefficient of each block b, b∈$B_M$, using a rate-distortion criteria. For example, the rate-distortion criteria can be as follows:

$$\min_{0 \leq c < W^*(k)+\epsilon | c_b(k) \in [0, W^*(k)+\epsilon)} d_b(k) + \lambda(-\log P(c - c_{b-1}(k))) \quad (9)$$

where $d_b(k)$ is the distortion term, and the rate term is the negative log of the probability of the difference between the current $c_b(k)$ and previous $c_{b-1}(k)$ for previous block b-1. In other words, encoder component 112 can be configured to only code the difference in shift $\Delta_b(k)=c_b(k)-c_{b-1}(k)$ between current and previous blocks. It is noted that $F_b(k)$ is the feasible set for $c_b(k)$ given step size $W^*(k)+\epsilon$.

Encoder component 112 can encode shift differentials $\Delta_b(k)$'s for different frequencies k in a given block b together as one codeword using arithmetic coding techniques. For example, starting with an initial probability distribution for $\Delta_b(k)$ for frequency k of the first block, each subsequent block derives an updated distribution based on collected statistics of previous coded merge blocks for this frequency.

In some embodiments, given high frequency components of the target frame are likely zero or close to zero, encoder component 112 can encode an EOB symbol when the remaining frequency components of the target block are all smaller than a threshold ρ. This means encoder component 112 can encode a small number of shift differentials $\Delta_b(k)$'s per block. In other embodiments, an EOB can be chosen according to rate-distortion optimization process, as described herein.

As described herein, by utilizing equation (9) to select shifts $c_b(k)$'s for large λ values, the resulting statistics for $\Delta_b(k)$'s can be much more favorable for compression than coset indices in coset coding or other coding techniques. It is noted that equation (9) is an exemplary equation and other equations can be utilized in various embodiments of this disclosure. In an aspect, given a single $W^*(k)$ is chosen for $k^{th}$ coefficients of all merge blocks (b∈$B_M$) in the frame, $W^*(k)$ is likely much larger than the typical maximum coefficient difference $W_b(k)$ among SI frames for many blocks b, b∈$B_M$. A large relative step size in the pwc function means that the same shift $c_b(k)$ can be reused for signal merging of a long sequence of blocks, i.e., $\Delta_b(k)=0$ has a high probability, resulting in compression gain when using arithmetic coding. This is in contrast to coset indices in coset coding, whose statistical behavior is more similar to a least significant bit process, which can be very random. The cost of choosing $\Delta_b(k)=0$ often in equation (9) is a penalty in distortion.

Figure 4:
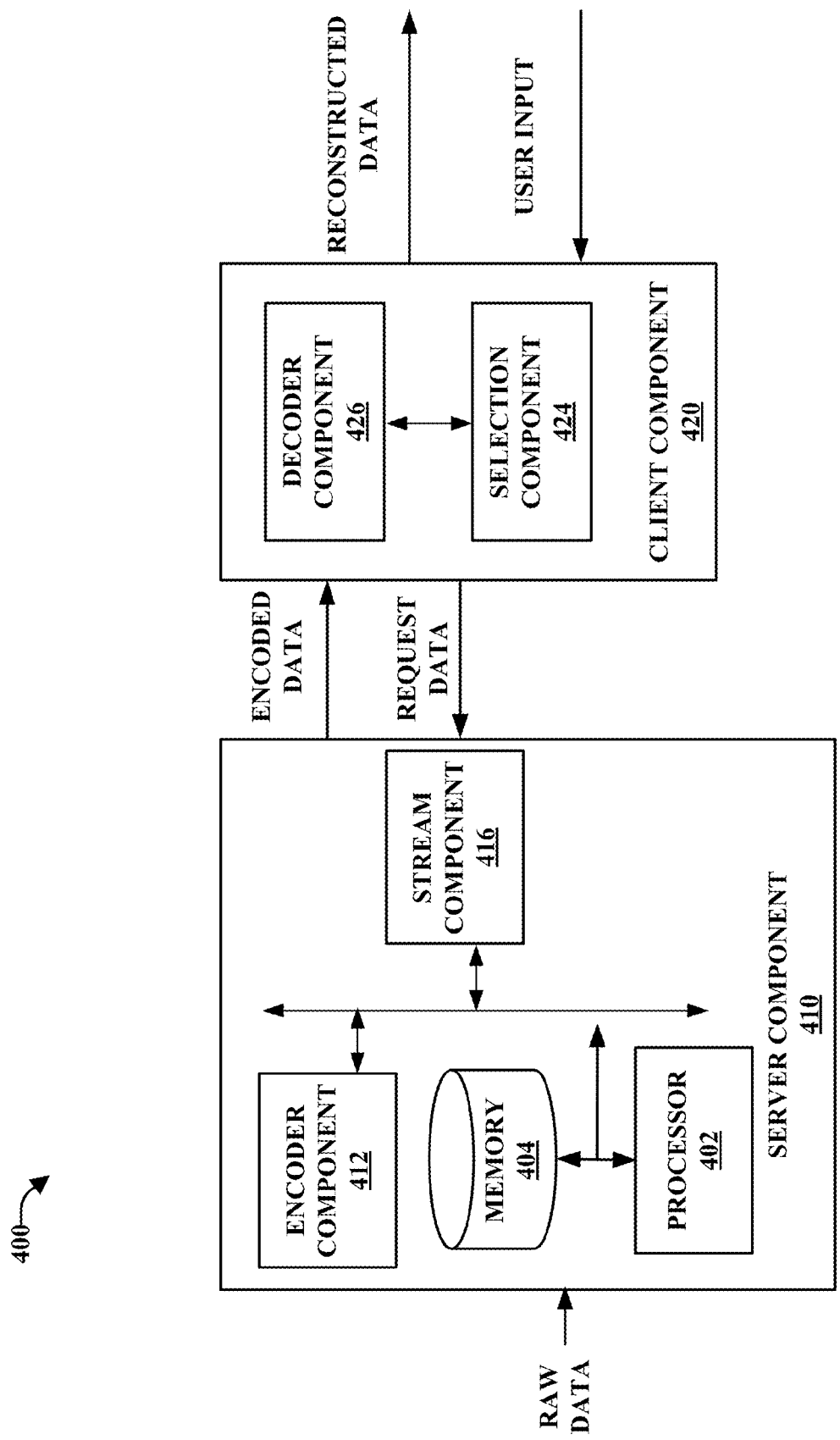
FIG. 4 illustrates an example functional block diagram of a system for content deliver including an encoder and a decoder in accordance with various embodiments.

Turning to FIG. 4, presented is a system 400 that can facilitate delivery of encoded content and stream-switching in accordance with various embodiments of the subject disclosure. Aspects of the systems, apparatuses or processes explained herein can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 400 can primarily include a server component 410 and a client component 420. Server component 410 can comprise a processor 402 that can facilitate operation of the computer executable components and instructions stored in a memory device, such as memory 404. It is noted that client component 420 can also comprise a processor and/or memory device. Server component 410 can further comprise an encoder component 412, and a stream component 416. The components of server component 410 can comprise all functionality of components of system 100 and/or additional functionality as described herein. Client component 420 can further comprise a decoder component 422 (which can decode a data stream) and a selection component 424 (which can generate requests to switch a data stream). It is further noted that the system 400 can comprise one or more clients, servers, and/or network applications. Moreover, while components are depicted as separate components, it is noted that the components can be comprised in one or more devices, in a single device, across devices, and the like. In another aspect, the components of system 400 can be comprised in larger devices, such as personal computers, servers, laptop computers, tablet computers, smart phones, personal digital assistants, and the like.

Selection component 424 can receive user input associated with selection of a data stream. For example, a user can select a video from a CDN. The selection component 424 can generate a request for the data stream and facilitate transmission of the request to server component 410. In an aspect, selection component 424 can generate the request comprising data describing the data stream, data describing a user profile, data describing operating parameters of the client component 420, and the like. In another aspect, selection component 424 can generate update requests describing a user's desire to switch a data stream or performance metrics associated with receiving, displaying or decoding a data stream, and the like.

Server component 410 can receive a request from client component 420 and stream component 416 can select an appropriate data stream. For example, a user can request a video of a horse race from a CDN. The request can be received by the server component 410 and a data stream of the video of the horse race can be selected. In one or more examples, the data stream can be a pre-encoded data stream stored in a memory. In another example, the data stream can be encoded (e.g., via encoder component 412) in response to receiving the request. Stream component 416 can monitor incoming requests and parameters of a network describing availability of network resources. For example, an incoming request can comprise data describing a user's desire to change views of a video, and stream component 416 can select the appropriate data stream. In another example, an incoming request can comprise data requesting an altered bit-rate associated with encoding the data stream (e.g., higher or lower bit-rate). In another example, an incoming request can comprise a desired bit-rate and/or an instruction to increase/decrease the bit-rate. In yet another example, stream component 416 can monitor network performance metrics and determine to switch data streams based on alterations to the monitored network performance metrics. For example, if a network is experiencing an increased load, stream component 416 can select a lower bit-rate data stream for transmission. In another example, if the network is experiencing a decreased load, stream component 416 can select a higher bit-rate data stream for transmission.

Encoder component 412 can facilitate merging of data streams based on aspects disclosed herein. For example, encoder component 412 can instruct stream component 416 to merge from a first data stream to a second data stream using merge frames and/or intra frames. In an aspect, the data streams can be switched and client component 420 can receive the switched data streams.

Decoder component 422 can decode an incoming data stream utilizing various embodiments disclosed herein. For example, decoder component 422 can receive a data stream comprising data describing a step size, a shift parameter, a merge function, data describing frame types and/or block types, and other data describing encoded content. In an aspect, decoder component 422 can comprise data describing encoding techniques and/or associated decoding techniques. It is noted that the decoding techniques can be determined based on stored data and/or determined based on data received in a data stream.

Decoder component 422 can decode incoming data streams such that data streams can merge any SI frame into an identically reconstructed good signal—using a pwc function as the merge operator. In an example, decoder component 422 can utilize a merge mode for a code block so that the pwc function can map corresponding coefficients from any SI frame to the same reconstructed value. As described supra, decoder component 422 can utilize the $k^{th}$ transform coefficient in the block, an appropriate step size and a horizontal shift parameter of a pwc function to reconstruct an image. A reconstructed image can be rendered on an interface device (e.g., monitor) such that stream mergers are efficiently handled.

Referring now to FIG. 5-8, presented are graphs 500, 600, 700, and 800 comparing aspects of this disclosure with a DSC frame encoding technique. Graph 500 compares encoding techniques of a video of a race horse, graph 600 compares encoding techniques of a video of a party scene, graph 700 compares encoding techniques of a video of a mall scene, and graph 800 compares encoding techniques of a video of a basketball drill. For each sequence, a system (e.g., system 100, system 300, system 400, etc.) generated two SI frames, which were predicatively coded using predictors of different coded versions of the previous frame compressed with different quantization parameters. Then, quantization parameters for the SI frames themselves were varied to induce different rate-distortion trade offs. Given a pair of SI frames, encoded with a particular quantization parameter, a system can encode merge frames using a range of λ values when choosing horizontal shifts using equation (9). The convex hull of all operational points represents the rate-distortion performance of aspects disclosed herein. For comparison, the graphs also comprise the rate-distortion performance of an alternative DSC encoding scheme (as represented by dashed lines).

Figure 5:
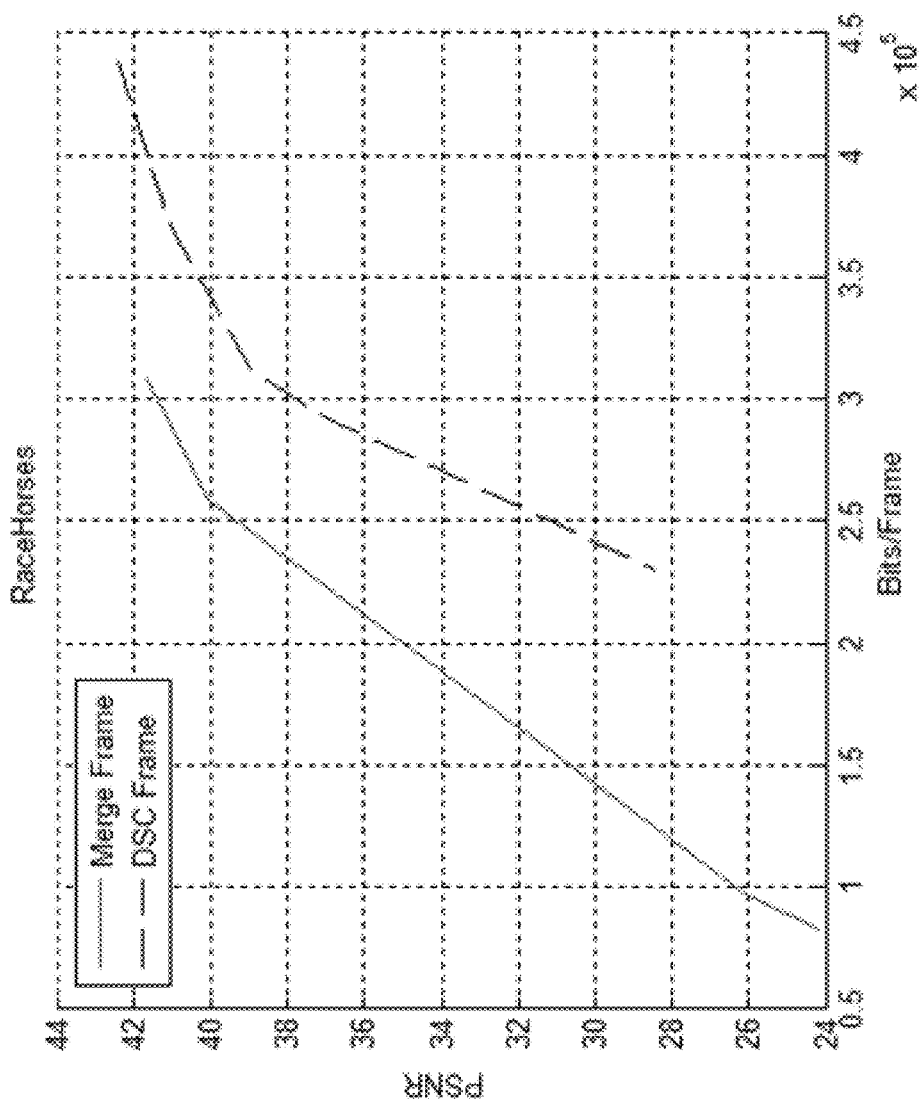
FIG. 5 illustrates an example graph comparing various merging systems in accordance with various embodiments.
Figure 6:
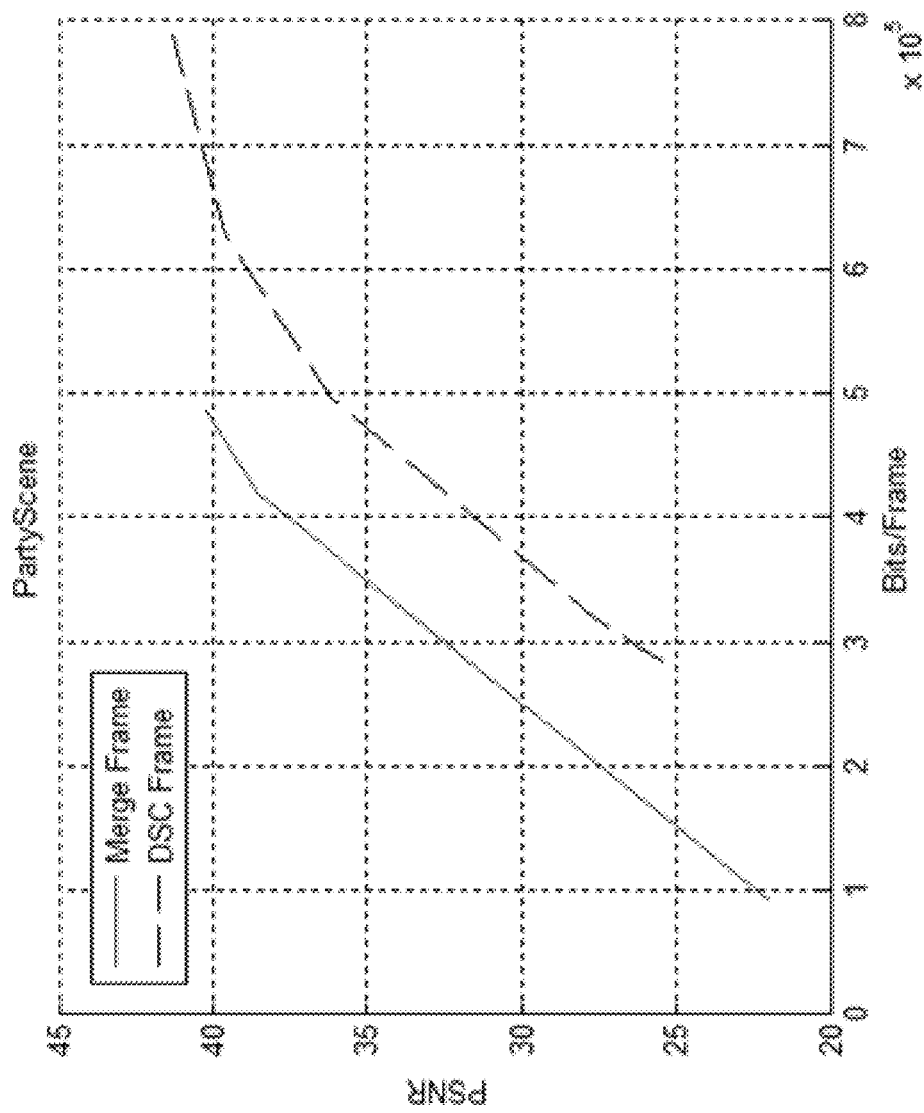
FIG. 6 illustrates an example graph comparing various merging systems in accordance with various embodiments.
Figure 7:
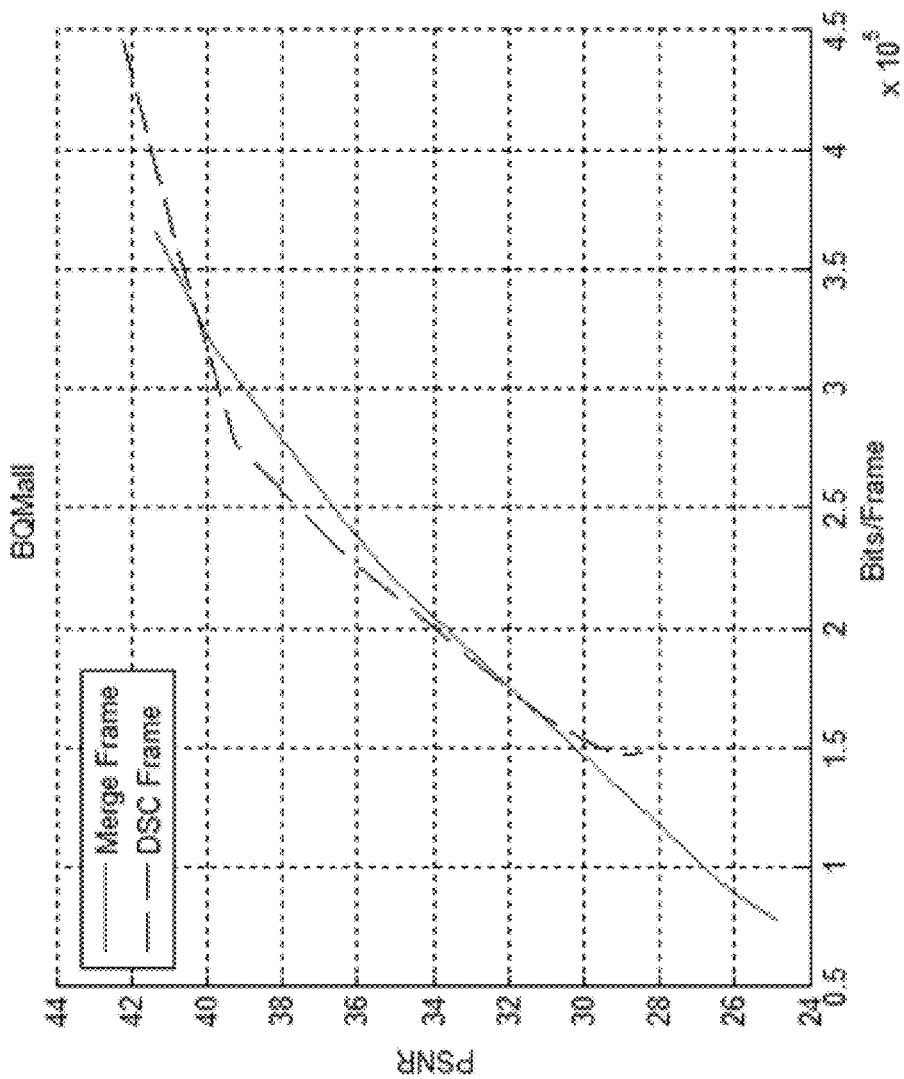
FIG. 7 illustrates an example graph comparing various merging systems in accordance with various embodiments.
Figure 8:
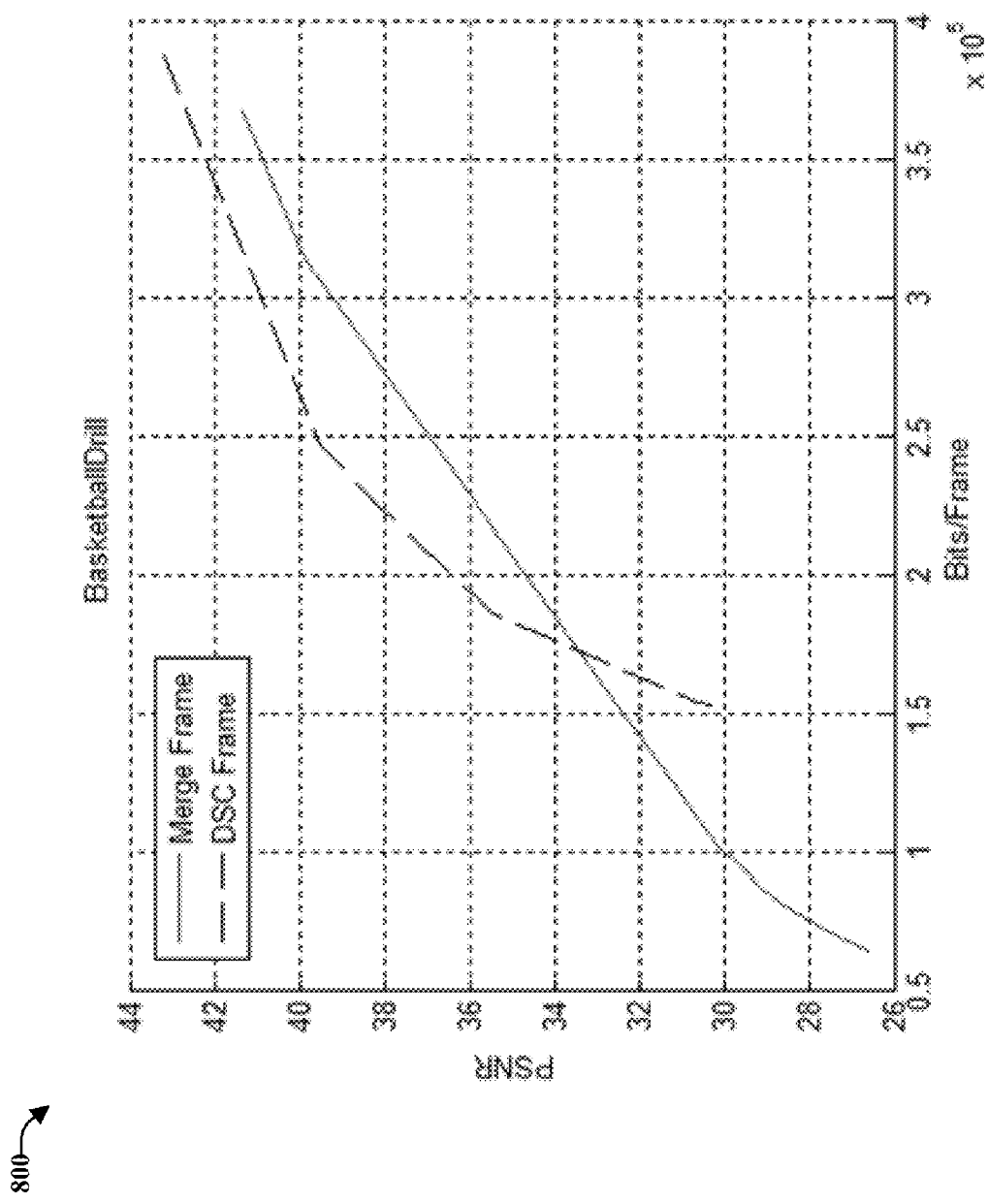
FIG. 8 illustrates an example graph comparing various merging systems in accordance with various embodiments.

In FIGS. 5 and 6, encoding techniques of this disclosure outperformed DSC frame encoding techniques at all bit-rate regions. In FIGS. 7 and 8, encoding techniques of this disclosure outperformed DSC at low- to mid-bit-rate regions. Though not shown, that statistics for $\Delta_b(k)$'s are more skewed towards $\Delta_b(k)=0$ at low bit-rates for all sequences, meaning horizontal shifts have more favorable statistics at low bit-rate for coding using arithmetic coding, which explains the performance. It is noted that performances of encoding techniques described in graphs 500-800 can be altered based on selection of parameters.

It is noted that encoding techniques of this disclosure can have even greater advantages in over DSC encoding techniques. For example, embodiments utilizing a rate-distortion selection process for an EOB and/or selection of skip modes can increase the performance of various systems. In another aspect, selection of various parameters and/or of different functions as a pwc function can provide for altered results. Results of such embodiments can provide for improved results in comparison with other encoding techniques.

In view of the example system(s) and apparatuses described above, example method(s) that can be implemented in accordance with the disclosed subject matter are further illustrated with reference to flowcharts of FIGS. 9-12. For purposes of simplicity of explanation, example methods disclosed herein are presented and described as a series of acts; however, it is noted that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described.

Figure 9:
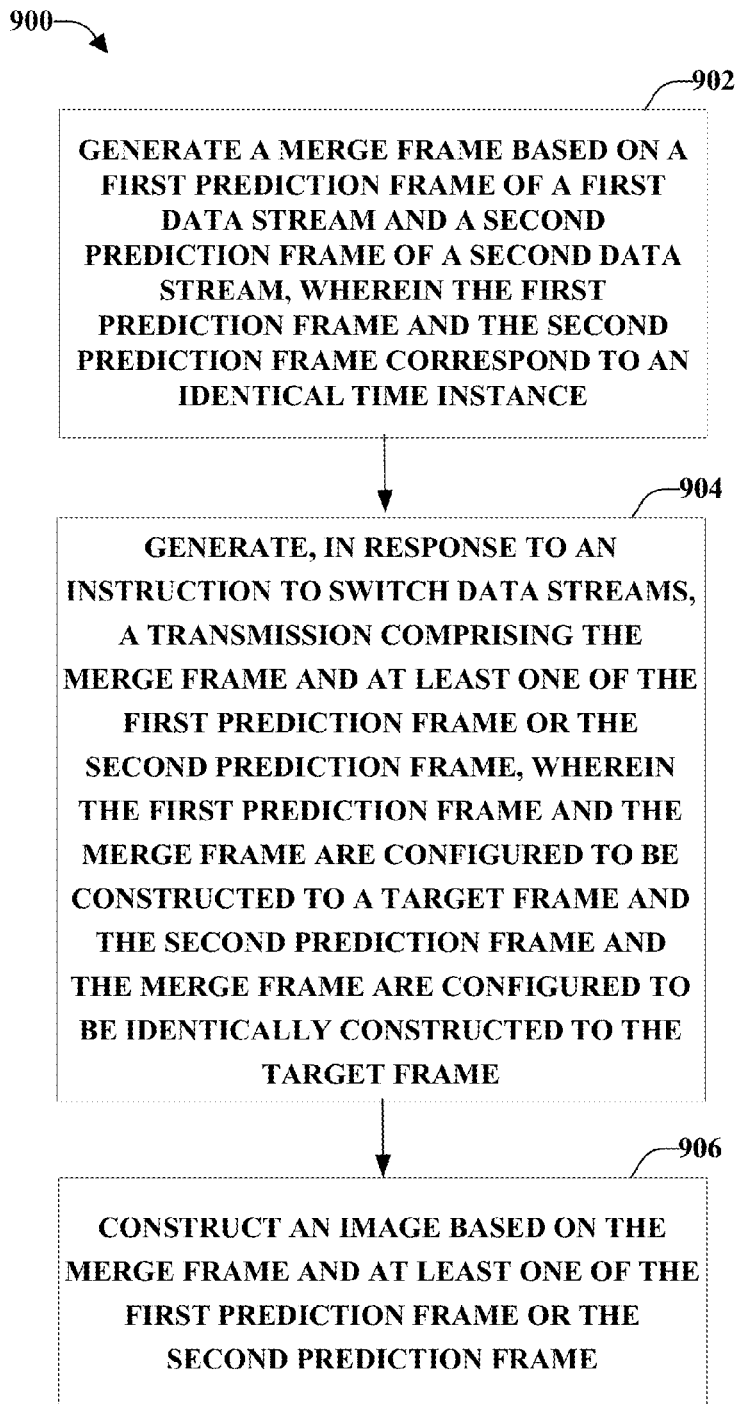
FIG. 9 illustrates an example flow diagram of a method for encoding and decoding merge frames in a content delivery system in accordance with an embodiment.

Turning to FIG. 9, there illustrated is an exemplary method 900 to encode and decode merge frames in a content delivery system. In an aspect, method 900 can generate merge frames as described herein, (e.g., via system 100, 300, 400, etc.). It is noted that efficiency(ies) of method 900 results from using various aspects of this disclosure.

At 902, a system can generate (e.g., via encoder component 112) a merge frame based on a first prediction frame of a first data stream and a second prediction frame of a second data stream, wherein the first prediction frame and the second prediction frame correspond to an identical time instance. As depicted in FIG. 2, a set of SI frames can be generated based on previous frames associated with one or more streams.

At 904, a system can generate (e.g., via stream component 116), in response to an instruction to switch data streams, a transmission comprising the merge frame and at least one of the first prediction frame or the second prediction frame, wherein the first prediction frame and the merge frame are configured to be constructed to a target frame and the second prediction frame and the merge frame are configured to be identically constructed to the target frame.

At 906, a system can construct (e.g., via decoder component 422) an image based on the merge frame and at least one of the first prediction frame or the second prediction frame. It is noted that the image can be reconstructed identically for either predication frame. In another aspect, constructing the image can comprise decoding a data stream and/or applying a pwc function and/or received parameters of the pwc function.

Figure 10:
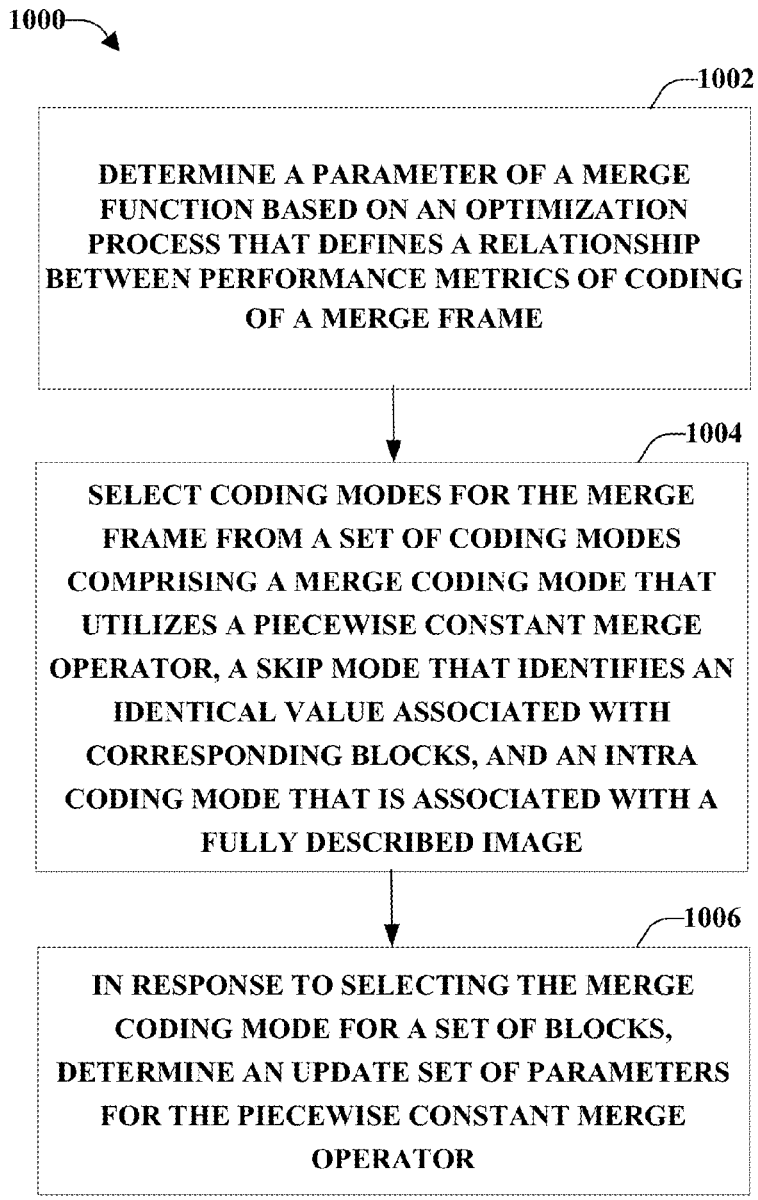
FIG. 10 illustrates an example flow diagram of a method for generating a merge frame in a content delivery system in accordance with an embodiment.

Referring now to FIG. 10, there illustrated is an exemplary method 1000 to generate a merge frame in a content delivery system. In an aspect, method 1000 can utilize a rate-distortion optimization process as described herein (e.g., via system 100, 300, 400, etc.). It is noted that efficiency(ies) of method 1000 results from using various aspects of this disclosure.

At 1002, a system can determine (e.g., via encoder component 112) a parameter of a merge function based on an optimization process that defines a relationship between performance metrics of coding of a merge frame. At 1004, a system can select (e.g., via encoder component 112) coding modes for the merge frame from a set of coding modes comprising a merge coding mode that utilizes a piecewise constant merge operator, a skip mode that identifies an identical value of corresponding blocks, or an intra coding mode that is associated with a fully described image on a per block basis. At 1006, a system can in response to selecting the merge coding mode for a set of blocks, determine (e.g., via encoder component 112) an update set of parameters for the piecewise constant merge operator.

Figure 11:
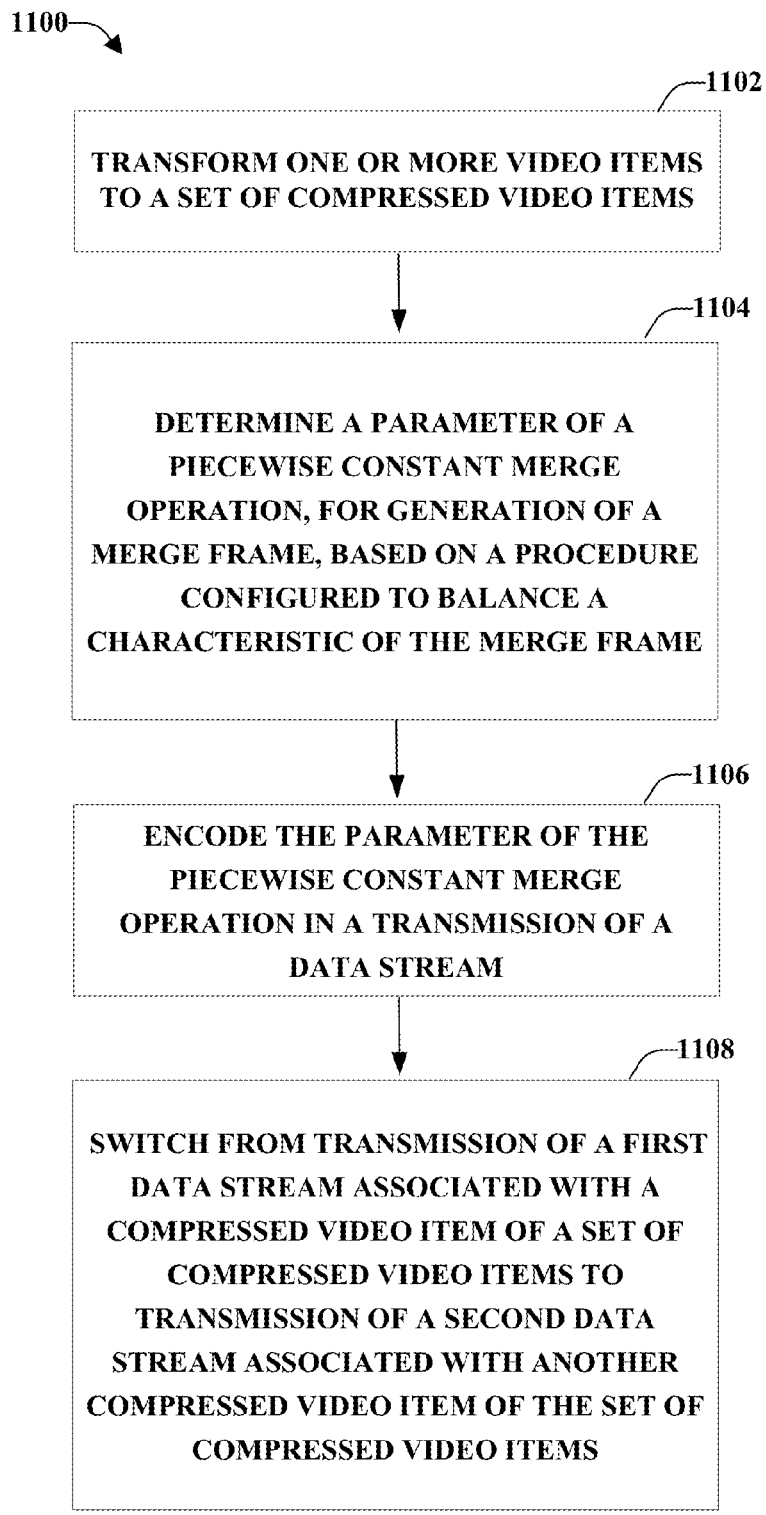
FIG. 11 illustrates an example flow diagram of a method for switching of data streams in a content delivery network in accordance with an embodiment.

FIG. 11 illustrates an exemplary method 1100 to facilitate switching of data streams in a content delivery network. It is noted that efficiency(ies) of method 1100 results from using various aspects of this disclosure. At 1102, a system can transform (e.g., via encoder component 412) one or more video items to a set of compressed video items. In an aspect, the system can utilize entropy encoding, discrete transforms, and the like. At 1104, a system can determine (e.g., via encoder component 412) parameters of a piecewise constant merge operation, for generation of a merge frame, based on a procedure configured to balance a characteristic of the merge frame. In an aspect, the procedure can be an optimization process that balances a size associated with the merge frame and a distortion associated with a target frame. As an example, the system can determine a step size and a shift parameter for a floor function. In another example, a system can determine an EOB position for each merge block in a merge frame. It is noted that the system can determine other parameters for various other pwc functions.

At 1106, a system can encode (e.g., via encoder component 412) the parameters of the piecewise constant merge operation in a transmission of a data stream. For example, the parameters can be encoded as coefficients of a block. At 1108, a system can switch (e.g., via stream component 416) from transmission of a first data stream associated with a compressed video item of the set of compressed video items to transmission of a second data stream associated with another compressed video item of the set of compressed video items.

Figure 12:
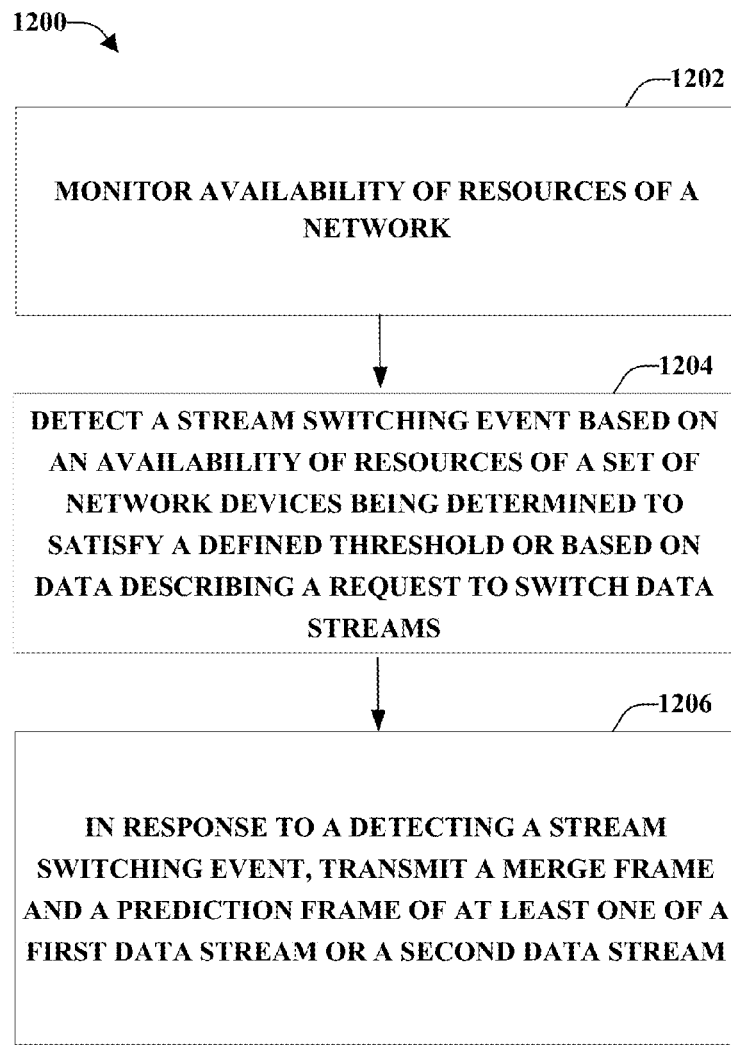
FIG. 12 illustrates an example flow diagram of a method for switching deliver of data streams in a content delivery network in accordance with an embodiment.

Turning to FIG. 12, with reference to FIGS. 1-4, there illustrated is an exemplary method 1200 to switch delivery of data streams in a content delivery system. It is noted that efficiency(ies) of method 1200 results from using various aspects of this disclosure. At 1202, a system can monitor (e.g., via stream component 416) availability of resources of a network. In an aspect, the system can determine network loads or other performance metrics associated with the network.

At 1204, the system can detect (e.g., via stream component 416) the stream-switching event based on an availability of resources of a set of network devices being determined to satisfy a defined threshold or based on data describing a request to switch data streams. For example, a system can determine to switch streams based on network loads. At 1206, the system can, in response to a detecting the stream-switching event, transmit (e.g., via stream component 416) a merge frame and a prediction frame of at least one of a first data stream or a second data stream.

Figure 13:
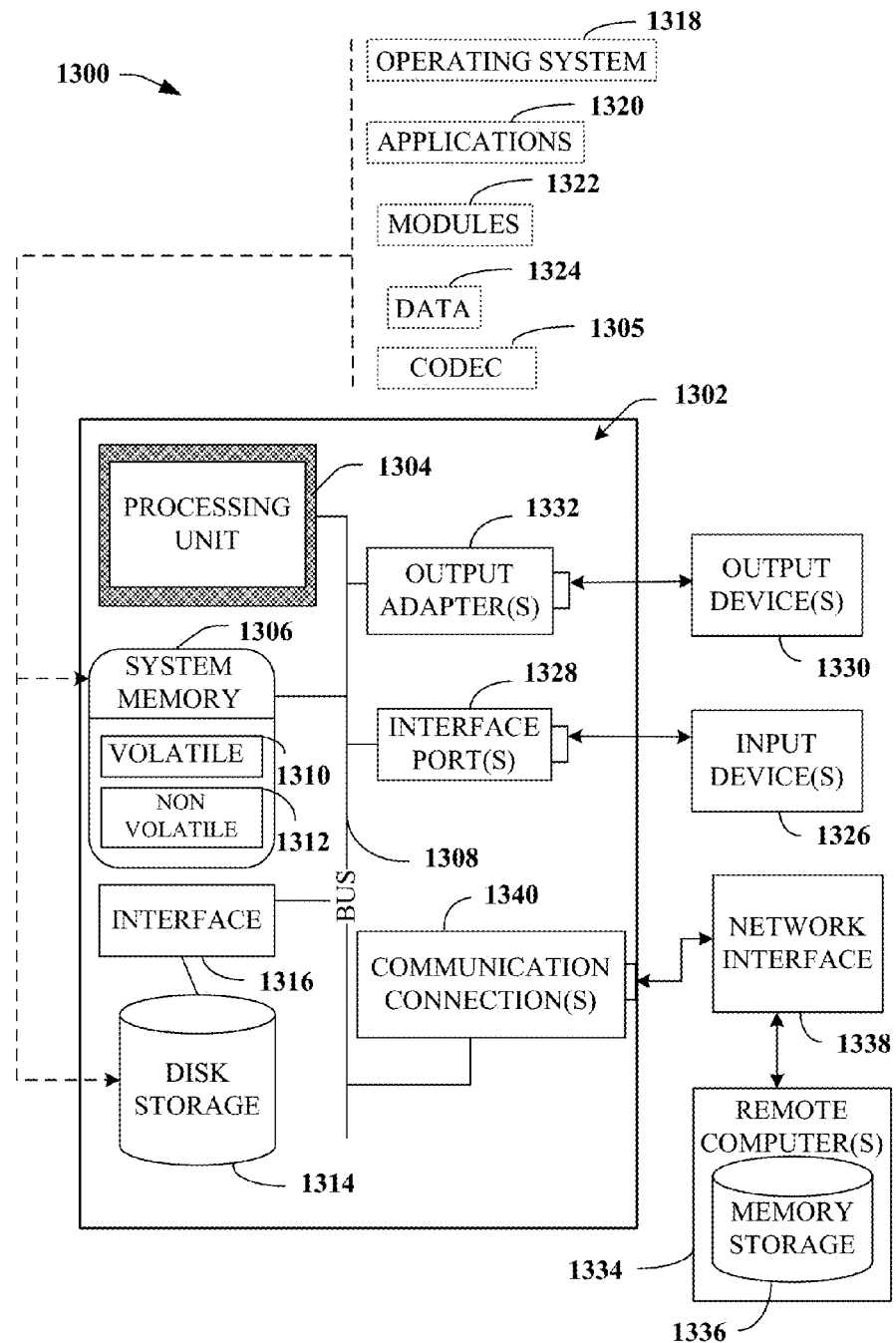
FIG. 13 illustrates an example block diagram of a computing system, in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 104) there can be software, which can instruct a processor (such as processor 102) to perform various actions. The processor can be configured to execute the instructions in order to implement encoding/decoding of a data stream utilizing a stream-switching process in accordance with various aspects disclosed herein.

Moreover, those skilled in the art will understand that the various aspects can be practiced with other computer system configurations, including single-processor or multiprocessor computer systems, mini-computing devices, mainframe computers, as well as personal computers, base stations, hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 13, a suitable environment 1300 for implementing various aspects of this disclosure includes a computer 1302. The computer 1302 includes a processing unit 1304, a system memory 1306, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and nonvolatile memory 1312. The basic input/output system (BIOS), containing the basic routines to transfer information between elements within the computer 1302, such as during start-up, is stored in nonvolatile memory 1312. By way of illustration, and not limitation, nonvolatile memory 1312 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1310 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1302 also includes removable/non-removable, volatile/non-volatile computer storage media. FIG. 13 illustrates, for example, a disk storage 1314. Disk storage 1314 includes, but is not limited to, devices like a magnetic disk drive, floppy disk drive, tape drive, Jaz drive, Zip drive, LS-100 drive, flash memory card, or memory stick. The disk storage 1314 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

FIG. 13 also depicts software that acts as an intermediary between users and the basic computer resources described in the suitable operating environment 1300. Such software includes, for example, an operating system 1318. Operating system 1318, which can be stored on disk storage 1314, acts to control and allocate resources of the computer system 1302. System applications 1320 take advantage of the management of resources by operating system 1318 through program modules 1322 and program data 1324, e.g., stored either in system memory 1306 or on disk storage 1314. It is to be appreciated that this disclosure can be implemented with various operating systems or combinations of operating systems.

A user enters commands or information into the computer 1302 through input device(s) 1326. Input devices 1326 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1328. Interface port(s) 1328 include, for example, a serial port, a parallel port, a game port, and a universal serial bus (USB). Output device(s) 1330 use some of the same type of ports as input device(s) 1326. Thus, for example, a USB port may be used to provide input to computer 1302 and to output information from computer 1302 to an output device 1330. Output adapter 1332 is provided to illustrate that there are some output devices 1330 like monitors, speakers, and printers, among other output devices 1330, which require special adapters. The output adapters 1332 include, by way of illustration and not limitation, video and sound cards that provide a means of connection between the output device 1330 and the system bus 1308. It should be noted that other devices and/or systems of devices provide both input and output capabilities such as remote computer(s) 1334.

Computer 1302 can operate in a networked environment using logical connections to one or more remote computers, such as remote computer(s) 1334. The remote computer(s) 1334 can be a personal computer, a server, a router, a network PC, a workstation, a microprocessor based appliance, a peer device or other common network node and the like, and typically includes many or all of the elements described relative to computer 1302. For purposes of brevity, only a memory storage device 1336 is illustrated with remote computer(s) 1334. Remote computer(s) 1334 is logically connected to computer 1302 through a network interface 1338 and then physically connected via communication connection 1340. Network interface 1338 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1340 refers to the hardware/software employed to connect the network interface 1338 to the bus 1308. While communication connection 1340 is shown for illustrative clarity inside computer 1302, it can also be external to computer 1302. The hardware/software necessary for connection to the network interface 1338 includes, for exemplary purposes only, internal and external technologies such as, modems including regular telephone grade modems, cable modems and DSL modems, ISDN adapters, and Ethernet cards.

In accordance with various aspects and implementations, the computer 1302 can be used to encode data, such as digital media data, which can be in the form of a sequence of video frames (e.g., raw video frames). As more fully disclosed herein, in some implementations, the computer 1302 can include a plurality of processors that can be used to process data and perform computing tasks (e.g., encoding-related tasks and/or decoding-related tasks, etc.). The computer 1302 includes a codec 1305 that can contain, for example, an encoder component and/or decoder component (e.g., system 100, system 400, etc.), each of which can respectively function as more fully disclosed herein. In some implementations, the codec 1305 can perform various encoding tasks (e.g., generating motion estimations and motion vectors, encoding blocks and associated motion vectors, determining whether to use an intra mode, a skip mode or a merge mode, a rate-distortion optimization, identifying a coding mode associated with a current block, allocating bits for encoding of a current block, etc.) on data (e.g., sequentially or in parallel). In some implementations, the codec 1305 can additionally or alternatively perform various decoding tasks (e.g., decoding blocks via a step size, a pwc function, etc.) on data (e.g., sequentially or in parallel).

According to an implementation, the one or more devices of the multiple-input multiple-output network comprise a combination of cells, user devices, and antennas. In some implementations, the one or more devices of the multiple-input multiple-output network comprise a three or more cells.

Figure 14:
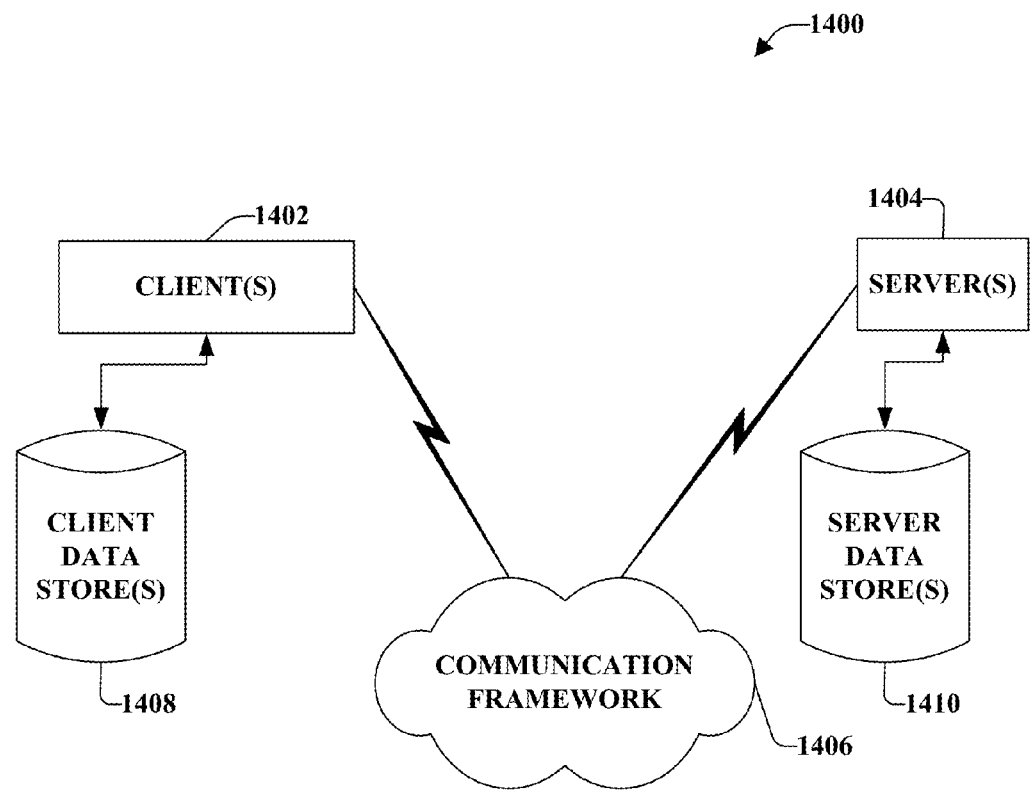
FIG. 14 illustrates an example block diagram representing exemplary non-limiting networked environments in which various non-limiting embodiments described herein can be implemented.

FIG. 14 is a schematic block diagram of a sample-computing environment 1400 with which the subject matter of this disclosure can interact. The system 1400 includes one or more client(s) 1402. The client(s) 1402 can be hardware and/or software (e.g., threads, processes, computing devices). The system 1400 also includes one or more server(s) 1404. Thus, system 1400 can correspond to a two-tier client server model or a multi-tier model (e.g., client, middle tier server, data server), amongst other models. The server(s) 1404 can also be hardware and/or software (e.g., threads, processes, computing devices). The servers 1404 can house threads to perform transformations by employing this disclosure, for example. One possible communication between a client 1402 and a server 1404 may be in the form of a data packet transmitted between two or more computer processes.

The system 1400 includes a communication framework 1406 that can be employed to facilitate communications between the client(s) 1402 and the server(s) 1404. The client(s) 1402 are operatively connected to one or more client data store(s) 1408 that can be employed to store information local to the client(s) 1402. Similarly, the server(s) 1404 are operatively connected to one or more server data store(s) 1410 that can be employed to store information local to the servers 1404.

It is to be appreciated and understood that components (e.g., encoder component, decoder component, stream component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, tablets), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. In yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., encoder component, encoder, codec, encoder component, decoder component, decoder, identification component, matching component, computation component, management component, processing component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a processor, communicatively coupled to a memory, that executes or facilitates execution of executable components stored in a memory, the executable components comprising:
  an encoder component configured to generate a merge frame based on a first prediction frame of a first data stream and a second prediction frame of a second data stream, wherein the first prediction frame and the second prediction frame correspond to an identical time instance; and
  a streaming component configured to generate, in response to an instruction to switch data streams, a transmission comprising the merge frame and at least one of the first prediction frame or the second prediction frame, wherein the first prediction frame and the merge frame are configured to be constructed to a target frame and the second prediction frame and the merge frame are configured to be identically constructed to the target frame.

2. The system of claim 1, wherein the encoder component is further configured to generate the merge frame based on a piecewise constant merge operator.

3. The system of claim 2, wherein the encoder component is further configured to select a parameter of the piecewise constant merge operator based on a procedure configured to balance a characteristic of the merge frame.

4. The system of claim 3, wherein the encoder component is further configured to select a step size and a horizontal shift based on a rate-distortion procedure that balances a bit-rate of the merge frame and a distortion metric of the target frame.

5. The system of claim 2, wherein the encoder component is further configured to encode a parameter for the piecewise constant merge operator in the transmission.

6. The system of claim 2, wherein the encoder component is further configured to determine a position for an end of block flag based on a procedure configured to balance a characteristic of the merge frame.

7. The system of claim 2, wherein the piecewise constant merge operator is selected from a group comprising a ceil operator, a round operator, and a floor operator.

8. The system of claim 1, wherein the encoder component is further configured to select a coding mode for the merge frame from a set of coding modes comprising a merge coding mode that utilizes a piecewise constant merge operator, a skip mode that identifies an identical value associated with corresponding blocks, or an intra coding mode that is associated with a fully described image.

9. The system of claim 8, wherein the encoder component is further configured to select the coding mode for blocks of the merge frame on a per block basis.

10. The system of claim 9, wherein the encoder component is further configured to select the coding mode for a block of the merge frame based on comparison of coding the block of the merge frame in the merge coding mode, coding the block of the merge frame in the intra coding mode, and coding the block of the merge frame in the skip coding mode.

11. The system of claim 8, wherein the encoder component is further configured to, in response to selecting the merge coding mode for a set of blocks, determine a new step size and a new horizontal shift for the piecewise constant merge operator.

12. The system of claim 1, further comprising a decoder component configured to construct an image based on the merge frame and at least one of the first prediction frame or the second prediction frame.

13. A method, comprising:
  determining, by a system comprising a processor, a parameter of a merge function based on a process that defines a relationship between at least one performance metric of a coding of a merge frame;
  generating, by the system, the merge frame based on the merge function to switch from a first transmission of a first data stream to a second transmission of a second data stream, wherein the merge function comprises a first prediction frame of the first data stream and a second prediction frame of the second data stream; and
  in response to detecting a stream-switching event, transmitting, by the system, the merge frame and the first prediction frame or the second prediction frame, wherein the first prediction frame and the merge frame are constructed to a target frame and the second prediction frame and the merge frame are constructed to the target frame.

14. The method of claim 13, further comprising:
  detecting, by the system, the stream-switching event based on an availability of resources of a set of network devices being determined to satisfy a defined threshold.

15. The method of claim 13, further comprising:
  detecting, by the system, the stream-switching event based on data describing a request to switch data streams.

16. The method of claim 13, wherein the generating the merge frame comprises:
  determining a coding process for each block of the merge frame based on the process; and
  in response to determining to utilize a merge coding process for a set of blocks, determining a step size and a horizontal shift for the set of blocks.

17. A system, comprising:
  a memory to store executable instructions; and
  a processor, coupled to the memory, that executes or facilitates execution of the executable instructions to perform operations, comprising:
  transforming one or more video items to a set of compressed video items;
  determining parameters of a piecewise constant merge operation, for generation of a merge frame, based on a process that balances a size associated with the merge frame and a distortion associated with a target frame; and
  generating the merge frame based on the piecewise constant merge operation, a first prediction frame of a first compressed video item of the set of compressed video items, and a second prediction frame of a second compressed video item of the set of compressed video items.

18. The system of claim 17, wherein the operations further comprise switching from a first transmission of a first data stream associated with a compressed video item of the set of compressed video items to a second transmission of a second data stream associated with another compressed video item of the set of compressed video items.

19. The system of claim 17, wherein the generating the merge frame comprises selecting a first set of blocks of the merge frame for an intra coding process, selecting a second set of blocks of the merge frame for a skip coding process, and selecting a third set of blocks of the merge frame for a merge coding process.

20. The system of claim 17, wherein the generating the merge frame comprises encoding the parameters of the piecewise constant merge operation in a transmission of a data stream.

21. A computer-readable storage device comprising executable instructions that, in response to execution, cause a device comprising a processor to perform operations, comprising:
  generating a merge frame representing a compressed portion of a media item that is configured to facilitate switching from delivery of a first data stream to delivery of a second data stream, wherein a target frame is identically constructed based on the first data stream or based on the second data stream; and determining a parameter of a merge operation, that represents an operation utilized for an encoding process for the merge frame, based on an optimization of a size of the merge frame and a distortion associated with the target frame.

22. The computer-readable storage device of claim 21, wherein the generating the merge frame comprises selecting coding modes for blocks of the merge frame based on a comparison of a first set of values, associated with a first coding process, for the blocks of the merge frame and a second set of values, associated with a second coding process, for the blocks of the merge frame.

23. The computer-readable storage device of claim 21, wherein the operations further comprise altering delivery of the first data stream to delivery of the second data stream in response to detecting a request to switch data streams.

24. The computer-readable storage device of claim 21, wherein the altering the delivery of the first data stream to delivery of the second data stream comprises encoding the merge frame in the second data stream.

* * * * *